US006969134B2

(12) United States Patent
Hohberger et al.

(10) Patent No.: US 6,969,134 B2
(45) Date of Patent: Nov. 29, 2005

(54) PRINTER OR OTHER MEDIA PROCESSOR WITH ON-DEMAND SELECTIVE MEDIA CONVERTER

(75) Inventors: Clive P. Hohberger, Highland Park, IL (US); Matthew R. Ream, Naperville, IL (US); Daniel F. Donato, Mundelein, IL (US)

(73) Assignee: ZIH Corp., Hamilton (BM)

( * ) Notice: Subject to any disclaimer, the term of this patent is extended or adjusted under 35 U.S.C. 154(b) by 46 days.

(21) Appl. No.: 10/406,469

(22) Filed: Apr. 3, 2003

(65) Prior Publication Data

US 2003/0227528 A1 Dec. 11, 2003

Related U.S. Application Data

(63) Continuation-in-part of application No. 10/001,364, filed on Oct. 25, 2001, now Pat. No. 6,857,714, which is a continuation of application No. 09/969,114, filed on Oct. 1, 2001, now abandoned.

(51) Int. Cl.[7] ............................................... B41J 3/00
(52) U.S. Cl. ....................................................... 347/2
(58) Field of Search ............................... 347/2, 14, 106; 340/572.1; 156/344, 384, 385, 387, 388, 156/442, 584, 360, 363

(56) References Cited

U.S. PATENT DOCUMENTS

| | | | | |
|---|---|---|---|---|
| 3,729,362 A | * | 4/1973 | French et al. | ................ 156/542 |
| 4,111,121 A | * | 9/1978 | Borum | ........................ 101/227 |
| 4,132,583 A | * | 1/1979 | Hodgson | ..................... 156/351 |
| 4,516,208 A | * | 5/1985 | Sakura et al. | ................ 705/416 |
| 4,846,504 A | * | 7/1989 | MacGregor et al. | ........ 283/102 |
| 5,024,718 A | * | 6/1991 | Hannen | ........................ 156/475 |
| 5,387,302 A | * | 2/1995 | Bernard et al. | .............. 156/352 |
| 5,660,663 A | | 8/1997 | Chamberlain et al. | ....... 156/152 |
| 5,781,708 A | | 7/1998 | Austin et al. | .................. 358/1.6 |
| 5,810,353 A | * | 9/1998 | Baskette et al. | ............. 271/305 |
| 5,867,102 A | * | 2/1999 | Souder et al. | ............ 340/572.8 |
| 5,897,741 A | * | 4/1999 | Mills et al. | .................. 156/541 |
| 5,902,437 A | * | 5/1999 | McDonough et al. | ........ 156/234 |
| 5,909,233 A | | 6/1999 | Hamman et al. | ............ 347/188 |
| 6,019,865 A | * | 2/2000 | Palmer et al. | ............... 156/265 |
| 6,050,622 A | * | 4/2000 | Gustafson | ................ 292/307 R |
| 6,092,888 A | | 7/2000 | Eade et al. | ..................... 347/43 |
| 6,123,796 A | * | 9/2000 | Kathmann et al. | ........... 156/249 |

(Continued)

FOREIGN PATENT DOCUMENTS

GB         2303613 A   *   2/1997   ............ B31D 1/02

(Continued)

OTHER PUBLICATIONS

"Motorola announces BiStatic 125kHz RFID tag", Transponder News Press Release, Mar. 2, 1999.*

(Continued)

*Primary Examiner*—Thinh Nguyen
(74) *Attorney, Agent, or Firm*—Welsh & Katz, Ltd.

(57) ABSTRACT

On demand apparatus for use in a printer, printer module, stand-alone media converter, or other media processor includes a print device and a converting system. The print device receives a series of labels, tickets, tags, cards or other media samples and responds to a set of form and content print instructions which direct the print device regarding what and where to print on selected media samples. The converting system includes an applicator which receives the series of media samples from the print device and a series of value-adding elements. The applicator responds to a set of application instructions which direct the applicator to apply a value-adding element to selected media samples. A corresponding method is disclosed.

16 Claims, 30 Drawing Sheets

U.S. PATENT DOCUMENTS

| | | | |
|---|---|---|---|
| 6,173,119 B1 | 1/2001 | Manico et al. | 396/6 |
| 6,188,423 B1 | 2/2001 | Pou | 347/211 |
| 6,280,544 B1 * | 8/2001 | Fox et al. | 156/64 |
| 6,327,972 B2 * | 12/2001 | Heredia et al. | 101/35 |
| 6,334,921 B1 * | 1/2002 | Duschek | 156/230 |
| 6,357,503 B1 * | 3/2002 | Kromer et al. | 156/351 |
| 6,409,401 B1 | 6/2002 | Petteruti et al. | 400/88 |
| 6,451,154 B1 * | 9/2002 | Grabau et al. | 156/300 |
| 6,525,835 B1 * | 2/2003 | Gulati | 358/1.18 |
| 6,598,783 B2 * | 7/2003 | Brinkman | 229/116.1 |
| 2002/0145036 A1 * | 10/2002 | Otto | 235/383 |

FOREIGN PATENT DOCUMENTS

| | | | | |
|---|---|---|---|---|
| JP | 09185324 A | * | 7/1997 | G09B 29/10 |
| JP | 2001001424 A | * | 1/2001 | B31D 1/02 |

OTHER PUBLICATIONS

R-140™ RFID, Smart Label Printer and Encoder, Released Sep. 26, 2000.

"A "White Paper" on the Development of AIM Industry Standards for 13,56 MHz RFID Smart Labels and RFID Printer/Encoders", May 24, 2000.

"RFID Technology & Smart Labels", Sep. 14, 1999.

International Search Report for International Application No. PCT/US02/29457.

Two (2) pages from http://www.bielomatik.de/sixcms/detail.php?id=874&template=masch_detail_en—Apr. 1, 2003 re TAL-100 Transponder Attaching and Laminating Machine. Applicants submit that they were aware of the Bielomatik product more than one year prior to the filing of the above-identified patent application.

One (1) page from http://www.bielomatik.de/sixcms/detail.php?id=908&template=schema_detail_en—Apr. 1, 2003 re Multi-Web Lamination process flow: Smart Labels, Tags und (sic) Tickets. Applicants submit that they were aware of the Bielomatik product more than one year prior to the filing of the above-identified patent application.

Two (2) pages from http://www.bielomatik.de/sixcms/detail.php?id=876&template=masch_detail_en—Apr. 1, 2003 re TLA-100 Transponder and Label Attaching Machine. Applicants submit that they were aware of the Bielomatik product more than one year prior to the filing of the above-identified patent application.

One (1) page from http://www.bielomatik.de/sixcms/detail.php?id=903&template=schema_detail_en—Apr. 1, 2003 re Multi-Web Lamination process flow: Smart Labels (Compact Version). Applicants submit that they were aware of the Bielomatik product more than one year prior to the filing of the above-identified patent application.

Two (2) pages from http://www.bielomatik.de/sixcms/detail.php?id=877&template=masch_detail_en—Apr. 1, 2003 re TTL-100 Transponder and Ticket Laminating Machine. Applicants submit that they were aware of the Bielomatik product more than one year prior to the filing of the above-identified patent application.

One (1) page from http://www.bielomatik.de/sixcms/detail.php?id=906&template=schema_detail_en—Apr. 1, 2003 re Multi-Web Lamination process flow: Smart Tickets (Compact Version). Applicants submit that they were aware of the Bielomatik product more than one year prior to the filing of the above-identified patent application.

* cited by examiner

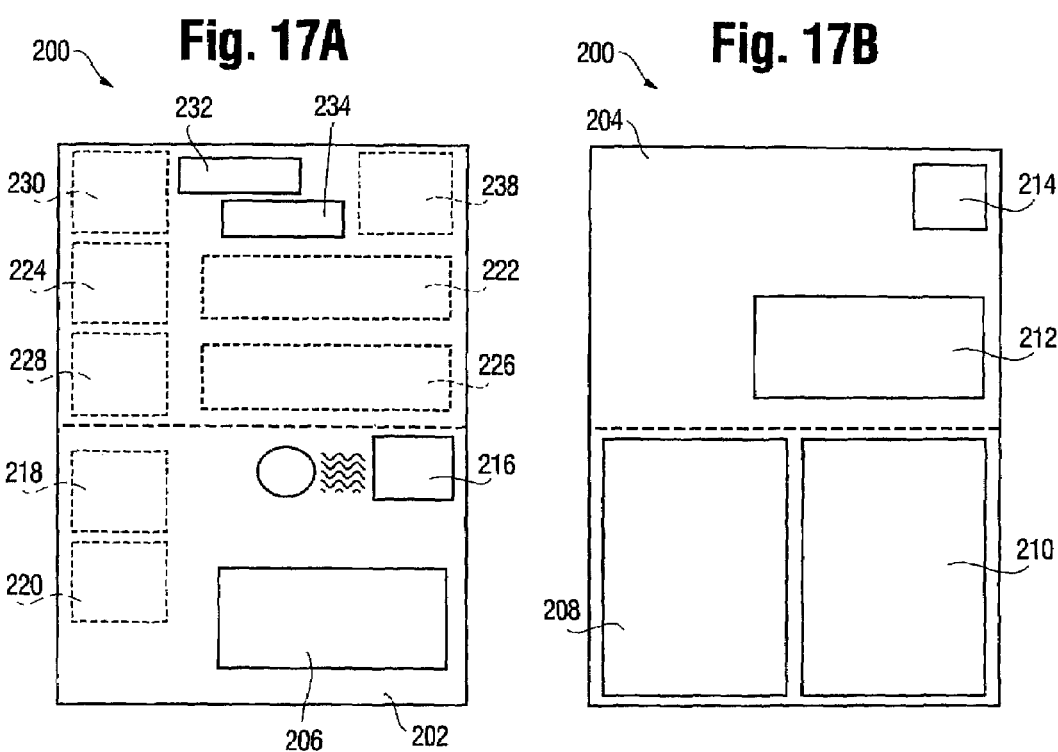

PRINTER OR OTHER MEDIA PROCESSOR WITH ON-DEMAND SELECTIVE MEDIA CONVERTER

CROSS-REFERENCE TO RELATED APPLICATIONS

This is a continuation-in-part of and claims the benefit of priority from application Ser. No. 10/001,364, filed Oct. 25, 2001 now U.S. Pat. No. 6,857,714, entitled Method and Apparatus For Associating On Demand Certain Selected Media And Value-Adding Elements, which is a continuation of application Ser. No. 09/969,114, filed Oct. 1, 2001, having the same title, now abandoned.

BACKGROUND OF THE INVENTION

The present invention concerns, in one aspect, a method and apparatus by which, both selectively and on-demand, individual labels, tickets, tags, cards, and the like (hereinafter collectively and in individual units referred to as "media", or individually as "media samples") having selected characteristics may be custom configured by causing one or more value-adding elements that have chosen characteristics to be associated with said media. More particularly, the invention is directed to method and apparatus for selectively incorporating one or more value-adding elements such as, for example, radio frequency identification (hereinafter called RFID) transponders with selected individual media samples on an on-demand basis.

Other types of value-adding elements that could be incorporated into media samples include, for example, shipping documents; parts to be inventoried, stored or shipped; promotional devices such as coupons, tokens, currency or other objects having a value to the recipient; integrated circuits on labels with leads to be connected to printed antennas; and attached or embedded objects that have associated information on the printed media relating to their identification or use.

The process of coupling or associating an RFID transponder (typically in the form of an inlay) with a label, ticket, tag, card or other media is commonly termed "converting", and the device used to accomplish converting is termed a "converter". As used herein this terminology will be extended to cover associating or coupling any value-adding element with a media sample.

A particularly suitable environment for the converting apparatus and method of this invention is a printer of the type commonly used to print bar codes, text and graphics. Such printers typically are offered as tabletop or portable devices or as part of label print and apply systems, and are used in factories, warehouses, shipping centers and a wide variety of other applications. Another favored environment is in card printers of the type used to create identification or security badges and the like.

The global installed base of such media printers is immense. These media printers are typically networked and print on demand from a central computer under software program control. Because of the flexibility of systems containing such printers, each media sample is capable of being unique in the text, graphics or codes imprinted on the media samples, as well as the attributes and number of value-adding elements.

With the burgeoning adoption of RFID technology, many users of media printers, for example, would like to have the capability of generating media samples with associated RFID transponders, herein termed "smart media", "smart labels", or the like. However, typically today such users may have only a part-time or occasional need to generate a smart label or other smart media. Currently, to acquire the capability of generating an occasional smart media prior to this invention, it is necessary for users to acquire one or more additional multi-function printers having the capability of encoding and testing smart media. Such a printer(s) is loaded with smart media and stands ready for occasional use. If such a printer is the only equipment available, and the user wishes to generate a conventional (non-smart) bar code label, for example, he must take the printer off line, de-install the smart labels, install standard (non-smart) labels, set up the printer and print the standard label. To then generate a smart label, the process must be reversed. An operation that called for mixed smart and standard labels or other media would obviously be difficult to execute in a single printer, or require duplication of equipments and supplies to support the use of both standard (non-smart) labels and smart labels in the same environment.

If different types of transponder formats are called for, the smart media printer must be taken down and re-setup for the alternate transponder format. Floor or table space for the duplicative equipment is often not available, and the extra equipment and inventory of rolls of smart media in various needed transponder formats increases operating costs.

Today, smart media printers necessarily print on media in which the transponders are already embedded. The printing process inevitably breaks transponder leads, creating expensive media rejects which must be removed or labeled as rejects. Ideally, separation of the printing process from the embedding of the transponder would lead to fewer smart labels with damaged transponders.

It has been estimated that more than half the cost of a smart label is in the fabrication. Less than half the cost is in the materials (transponder, transponder carrier, media, media carrier, etc.). Much of the cost is incurred by the multiple processing steps to conventionally fabricate a smart label.

The transponder (including antenna and typically, but not always, an integrated circuit) is mounted on a carrier to create an "inlay". Next a series of such inlays are mounted on a liner and wound on a roll for storage. Media such as label stock is mounted on a liner. To create smart labels, rolls of the label stock are brought together with rolls of transponder inlays. The label stock and liner is separated, transponder inlays inserted serially and the label stock and liner are rejoined to capture the inlays. The smart labels are then die cut and otherwise finished. The multiple processing steps, (such as inlay insertion into the labelstock and liner), including the high scrap rate in certain of such processing steps, are among the chief reasons for the high cost of smart labels today.

Although ink jet and various other printer technologies are employed in printers of the type discussed, a thermal transfer printer is commonly used to print individual media samples and will be described to frame the ensuing discussion of the present invention. Referring to FIG. 1, a side view of a standard thermal transfer printer mechanism 10 is illustrated. A label carrier 12 (also generally referred to as a release liner) carries adhesive-backed, (typically unprinted) diecut labels 14 through the mechanism. Typically, the top surface of each label is printed with a pattern of ink dots from a thermal transfer ribbon 16 melted onto the label surface as the ribbon and label pass under a computer-controlled thermal printhead 18.

An elastomer-coated platen roller 20 typically is driven by a stepping motor (not shown) to provide both the movement force for the ribbon and label by means of a friction drive action on the label carrier 12, as well as acting as the receiver for the required pressure of the printhead on the ribbon-label sandwich. This pressure assists in transferring the molten ink dots under printhead 18 from the thermal transfer ribbon 16 onto the diecut label 14 surface.

The thermal transfer ribbon 16 is unwound from a printer ribbon supply 22, and is guided under the thermal printhead 18 by idler rollers 24. After the ink is melted from the ribbon 16 onto the printed diecut label 26, the spent ribbon is wound on a printer ribbon take-up spindle 28.

Typically, a media exit 30 is located immediately after the printhead 18. The now-printed diecut label 26 is often dispensed on its label carrier 12. If a user desires that the printed diecut labels be automatically stripped from label carrier, then an optional peeler bar 32 is utilized. As the label carrier 12 passes over the sharp radius of peeler bar 32, the adhesive bond is broken, thereby releasing the printed diecut label 26 from its label carrier 12. The peeled, printed diecut label 26 is dispensed at media exit 30. The excess label carrier 12 is both tensioned for peeling and rewound using optional label carrier take-up mechanism 34.

As will be described in detail hereinafter, an exemplary embodiment of the present invention involves selectively and on demand associating, in the environment of a thermal or thermal transfer or other type of printer, an RFID transponder with a label, e.g., to create a "smart" label. Although much of the following discussion will be in the context of media in the form of labels, it should be understood that application of the invention is not limited to labels, and is equally applicable to tickets, tags, cards and other media.

Although "chipless" RFID transponders exist and may be utilized as one example of a value-added element with certain aspects of this invention, the most common form of an RFID transponder used in smart labels comprises an antenna and an RFID integrated circuit. Such RFID transponders include both DC powered active transponders and batteryless passive transponders, and are available in a variety of form factors. Commonly used passive inlay transponders 36 shown in FIG. 2 have a substantially thin, flat shape. For automatic insertion into labels, the inlay transponders 36 are typically, but not always prepared with a pressure-sensitive adhesive backing, and are delivered individually diecut and mounted with a uniform spacing on an inlay carrier.

Inlay transponders have been used as layers of identification tags and labels to carry encoded data, stored in a non-volatile memory area data, that may be read wirelessly at a distance. For example, a camera having a radio-frequency identification transponder that can be accessed for writing and reading at a distance is disclosed in U.S. Pat. No. 6,173,119.

The antenna 38 for an inlay transponder 36 is in the form of a conductive trace deposited on a non-conductive support 40, and has the shape of a flat coil or the like. Antenna leads 42 are also deposited, with non-conductive layers interposed as necessary. The RFID integrated circuit 44 of the inlay transponder 36 includes a non-volatile memory, such as an EEPROM (Electrically Erasable Programmable Read Only Memory); a subsystem for power generation from the RF field generated by the reader; RF communications capability; and internal control functions. The RFID integrated circuit 44 is mounted on the non-conductive support 40 and operatively connected through the antenna leads 42. The inlays are typically packaged singulated or on a Z-form or roll inlay carrier 46 as shown in FIG. 2.

It is known how to utilize on-press equipment for insertion of transponders into media to form "smart labels," and then to print information on a surface of the smart labels. See, for example, an application white paper entitled "RFID Technology & Smart Labels," dated Sep. 14, 1999, P/N 11315L Rev. 1 of Zebra Technologies Corporation. See also, for example, a document entitled "A White Paper On The Development Of AIM Industry Standards For 13.56 MHz RFID Smart Labels And RFID Printer/Encoders" by Clive P. Hohberger, PhD, that is dated May 24, 2000. Both of these documents are incorporated by reference into this application as if fully set forth herein.

It also is known how to utilize label applicator equipment to attach pressure-sensitive labels to business forms. Such equipment has been commercially available on the U.S. market from several companies for more than one year prior to the filing of this application.

Zebra Technologies Corporation is a leading manufacture of a number of printer related products, including a number of on-demand thermal transfer printers that incorporate a number of the aspects of the technology that is disclosed in the two above-referenced white papers. An example of such a "smart label" printer commercially available for more than a year prior to the filing of this application includes Zebra model number R-140.

Such products are satisfactory for their intended uses. However, the need for a smart printer or other media processor with on-demand selective converting capability has become urgent, but unmet prior to this invention. Certain features and advantages of the invention will become apparent from the description that follows.

BRIEF DESCRIPTION OF THE DRAWINGS

The objects and advantages of the present invention will become more readily apparent to those of ordinary skill in the relevant art after reviewing the following detailed description and accompanying drawings, wherein:

FIGS. 17A and 17B are schematic views of the front and reverse sides postcard set media that is on-demand printed and to which various value-added elements are added in a production process according to an exemplary embodiment of the present invention;

DETAILED DESCRIPTION OF ILLUSTRATIVE EMBODIMENTS

Figure 1:
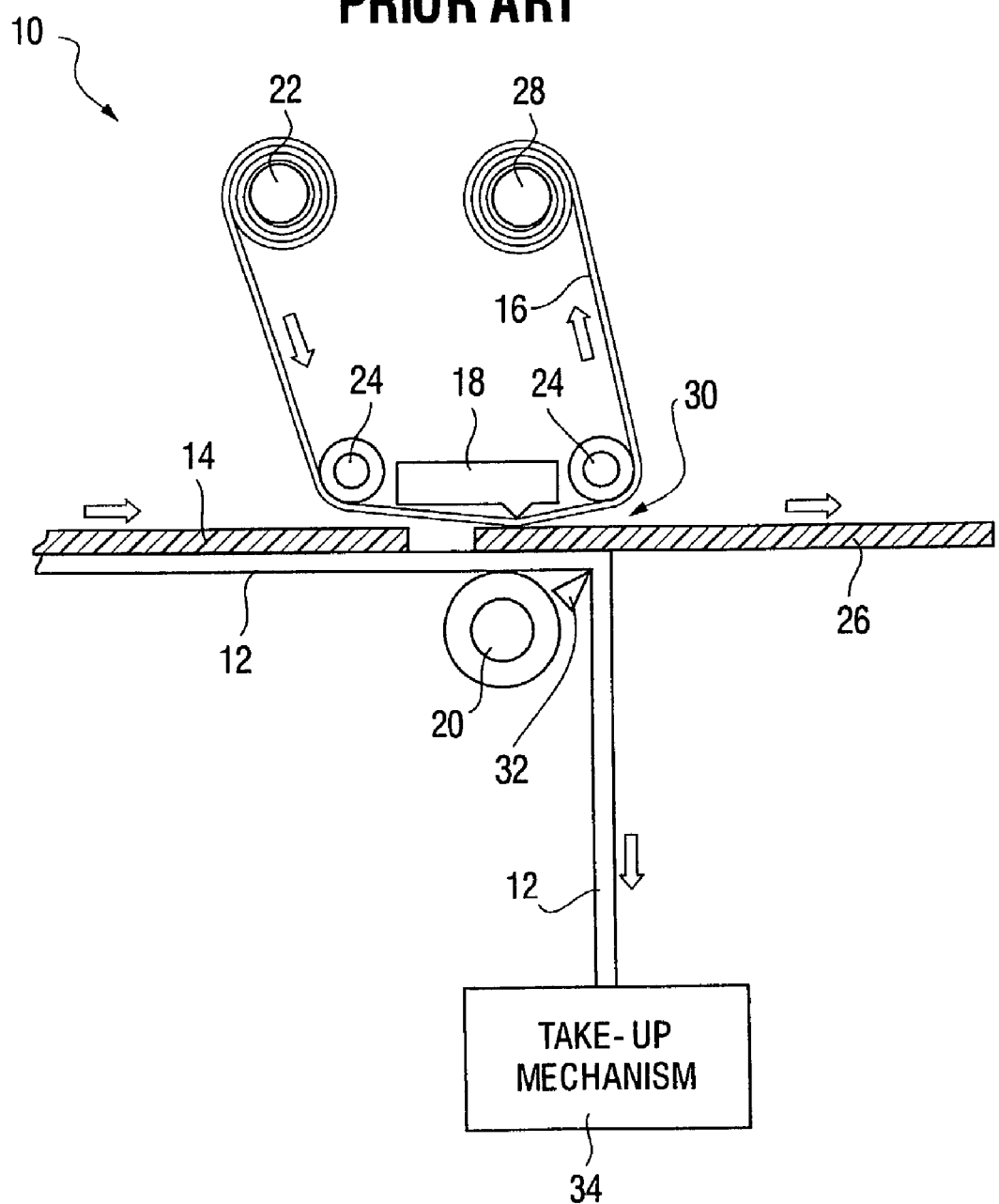
FIG. 1 is a side, schematic view of a standard thermal transfer label printer mechanism.
Figure 2:
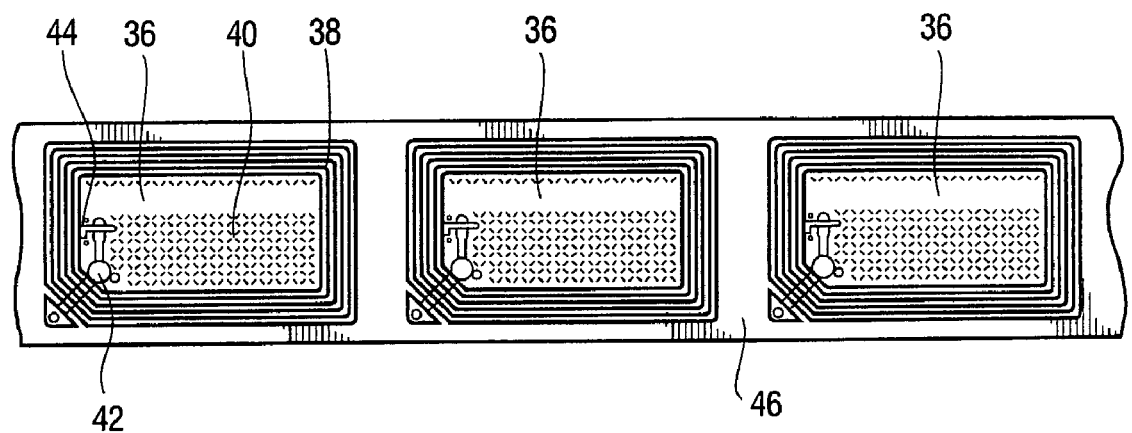
FIG. 2 is a schematic view of a plurality of passive inlay-type RFID transponders as delivered with an adhesive backing on an inlay carrier.

While the present invention is susceptible of embodiment in various forms, there are shown in the drawings a number of presently preferred embodiments that are discussed in greater detail hereafter. It should be understood that the present disclosure is to be considered as an exemplification of the present invention, and is not intended to limit the invention to the specific embodiments illustrated. It should be further understood that the title of this section of this application ("Detailed Description of Illustrative Embodiments") relates to a requirement of the United States Patent Office, and should not be found to limit the subject matter disclosed herein.

The present invention overcomes many of the difficulties and shortcomings of the prior art described in the Background of the Invention. With the present invention, in one system the user now has the ability to generate selectively, on demand, an RFID smart media from a stock of standard media. He can print on the created smart media after the transponder has been coupled to the media, thus overcoming the prior art problem of transponder damage resulting from printing over the transponder.

The transponder can be verified before and after attachment to the media to assure operability in the final media. The associated printer can print in monochrome or color bar codes, graphics, and visually readable text which may include information duplicating or overlapping information encoded in the transponder associated with the particular media. Thus each media sample can be customized with information stored in various formats and with various content depending on its ultimate use.

For example, a media sample that is to be scanned with a bar code scanner, read with an RFID reader and human-read visually can be created to store and present information in all three modes. Conversely, if the next media sample to be created only requires a bar code, graphics or text, but not be "smart", a media sample can be generated which does not contain an RFID transponder. The production of a variety of such media samples will typically be in networks under computer software control, but could be manual or have a manual override.

As will become evident from the ensuing description, the cost of smart labels for many applications such as for use in on-demand printers is greatly reduced through the elimination of many of the processing steps previously required to generate a smart label.

Figure 3:
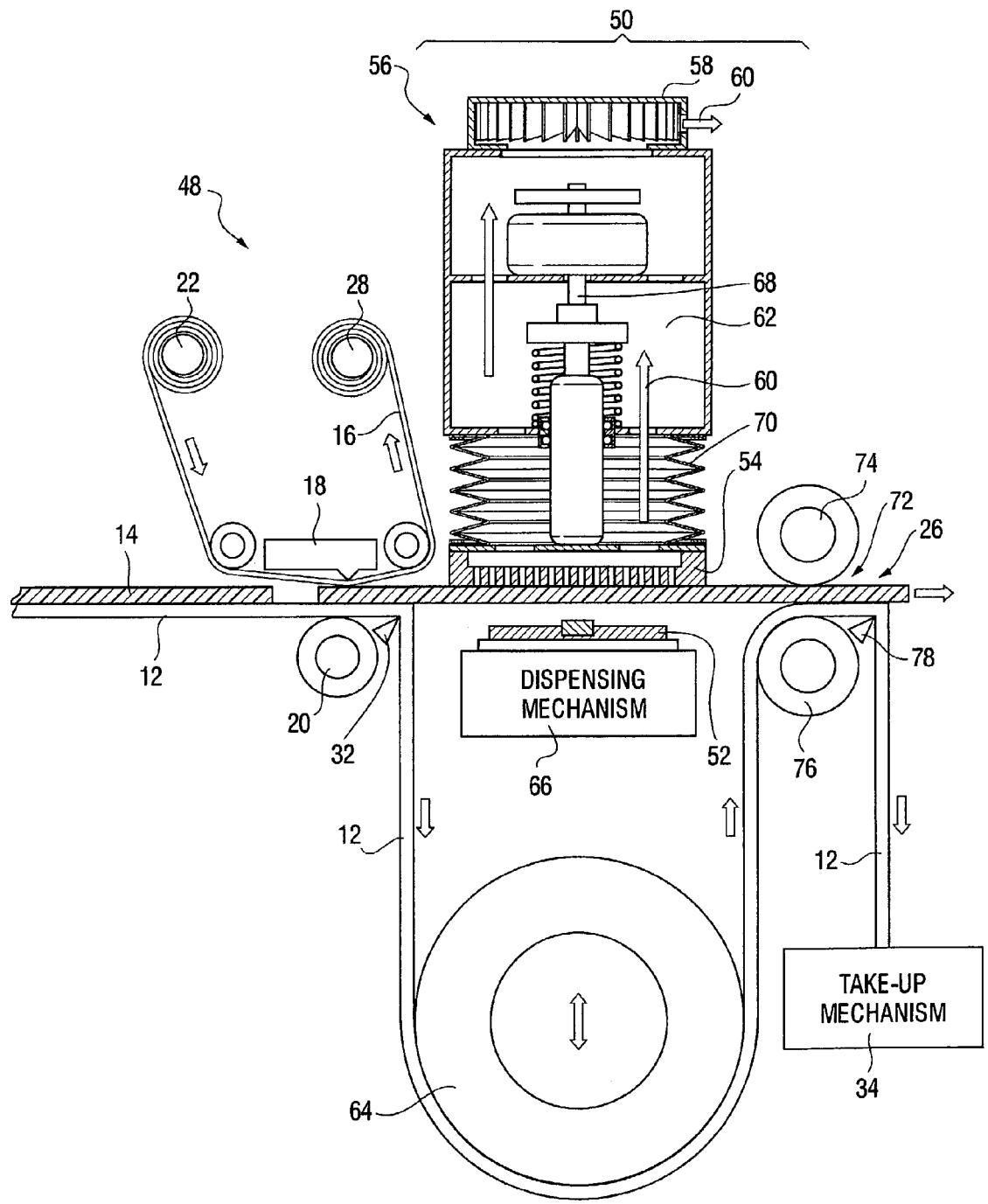
FIG. 3 is a side, schematic view of a thermal transfer printer that incorporates a number of aspects of an exemplary embodiment of the present invention disclosed in this application.

Referring to FIG. 3, a side, schematic view of a thermal transfer printer 48 that incorporates a number of aspects of the present invention disclosed in this application is shown. In the embodiment of the present invention illustrated in FIG. 3, the thermal transfer printer 48 comprises a standard thermal transfer printer mechanism that includes all of the components illustrated in FIG. 1. Printer 48 also includes a value-adding mechanism 50 comprising the identified objects 54–70 that cause a value-adding device such as, for example, a programmed RFID transponder 52 to be affixed to a media sample after it is printed as discussed in greater detail hereinafter.

It should be understood that value-adding mechanism 50 (sometimes termed herein a "dispenser" or "applicator" or the like) can be manufactured and sold apart from the thermal transfer printing mechanism 10 to allow existing thermal transfer printers to be retrofitted and, therefore, operate in accordance with a number of aspects of the invention disclosed in this application. It also should be understood that, while the illustrated embodiments of the present invention are disclosed in connection with thermal transfer printing, the present invention is applicable to ink jet, laser, and other printing technologies.

Referring back to FIG. 3, the thermal transfer printer 48 allows an adhesive-backed, preprogrammed RFID transponder 52 to be on demand selectively bonded to a printed diecut media sample (such as, for example, a printed diecut label 26) by the value-adding mechanism 50 under program control as discussed in greater detail hereinafter. The finished printed diecut label/programmed transponder sandwich (26/52) is presented at media exit 30 with the label carrier 12 optionally stripped.

Immediately after printing, the printed diecut label 26 is released from its label carrier 12 by passing over the sharp radius of the peeler bar 32. The delaminating process performed by peeler bar 32 exposes the adhesive on the bottom (unprinted) surface of the printed diecut label 26.

The printed diecut label 26 then continues in a straight line as it passes over a smooth, perforated vacuum guide plate 54 of a tamping applicator mechanism 56. A centrifugal fan 58 extracts air 60 to create a slight vacuum in the plenum 62. This causes a slight upward force to be maintained on the printed diecut label 26 that keeps it disposed against the smooth perforated vacuum guide plate 54. The magnitude of the vacuum force is at such a level that does not impede the forward motion of the printed diecut label 26. Plenum 60 is extensible along a central axis that is generally perpendicular to the path of movement of the label.

Figure 6:
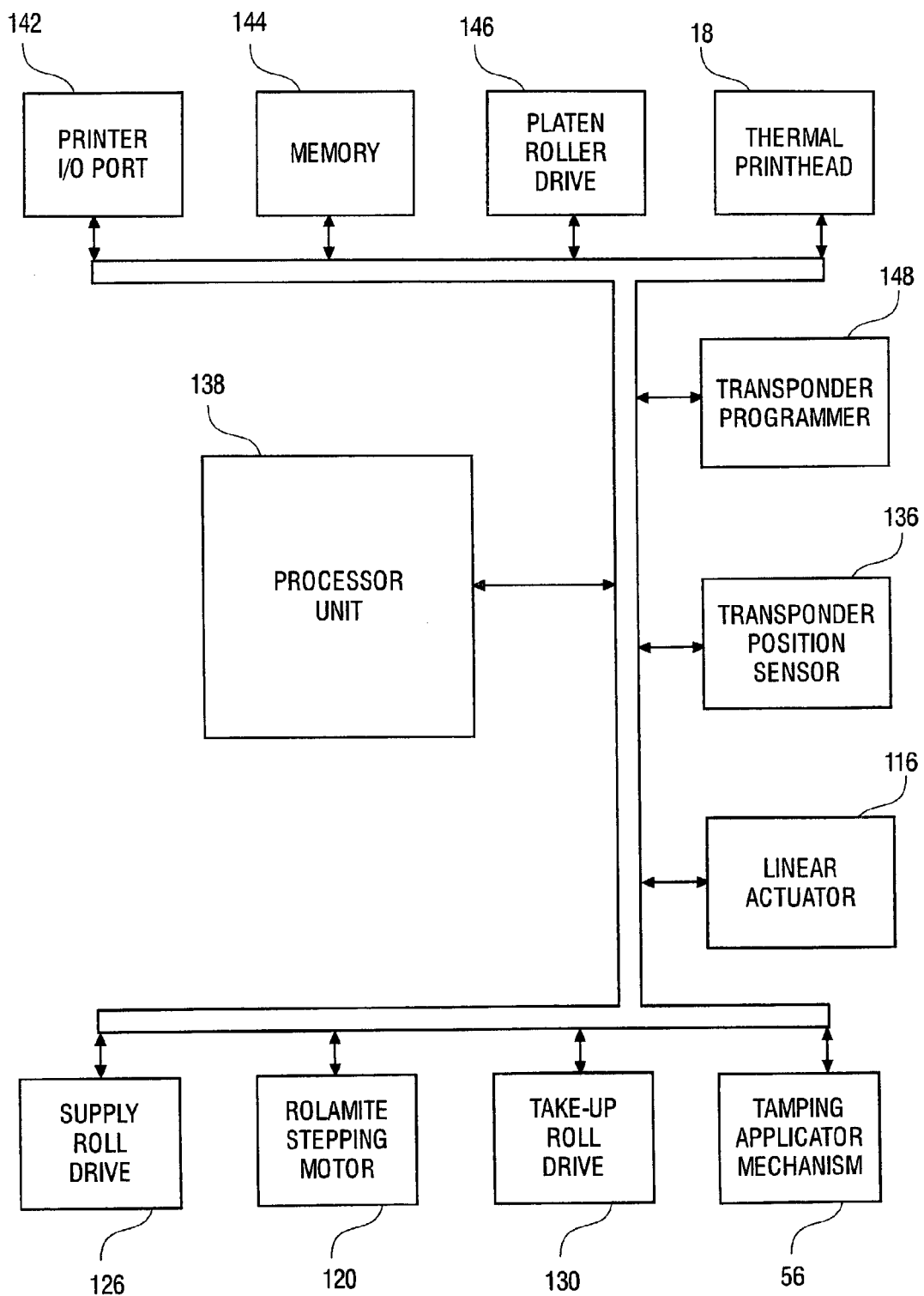
FIG. 6 is a schematic, block diagram of some of the key electronic subsystems and components of the thermal transfer printer shown in FIG. 3.

The delaminated label carrier 12 passes around a buffer loop roller 64 used to control the flow of the label carrier 12 around a transponder dispensing mechanism 66 (FIG. 6). The buffer loop roller 64 is free to float up and down, taking up and returning excess label carrier 12 at different times in the process.

In an exemplary embodiment, one function of the dispensing mechanism 66 is to position an adhesive-backed RFID transponder 52 underneath and in operative relation to the printed diecut label 26. RFID transponder 52 is transported on the inlay carrier 46 as shown. The tamping applicator mechanism 56 (FIG. 3) then extends the plenum 60 downwardly through the use of flexible bellows 70 so that the rigid, perforated vacuum guide plate 54 lightly tamps the printed side of printed diecut label 26. This causes the exposed adhesive surface of the printed diecut label 26 to be adhered to the top surface of the RFID transponder 52.

The label-transponder sandwich (26/52) is now advanced forwardly, and is passed through a nip 72 that is formed by upper nip roller 74 and lower nip roller 76. The nip compression both bonds the adhesive of the printed diecut label 26 to the RFID transponder 52, and relaminates label-transponder sandwich (26/52) to the label carrier 12. The formed diecut label-transponder-label carrier sandwich (26/52/12) then exits the value-adding mechanism 50. As is well known, the label carrier 12 may be optionally stripped from the diecut label/transponder sandwich (26/52) by the use of an exit peeler bar 78 and optional label carrier take-up mechanism 34.

Typically, only the lower nip roller 72 is driven, this roller being driven at the same surface speed as the platen roller 20. This allows, for example, printed diecut labels 26 that are longer than the gap between platen roller 20 and nip 72 to be accommodated in printer 48 without deforming the printed diecut label 26.

Figure 4:
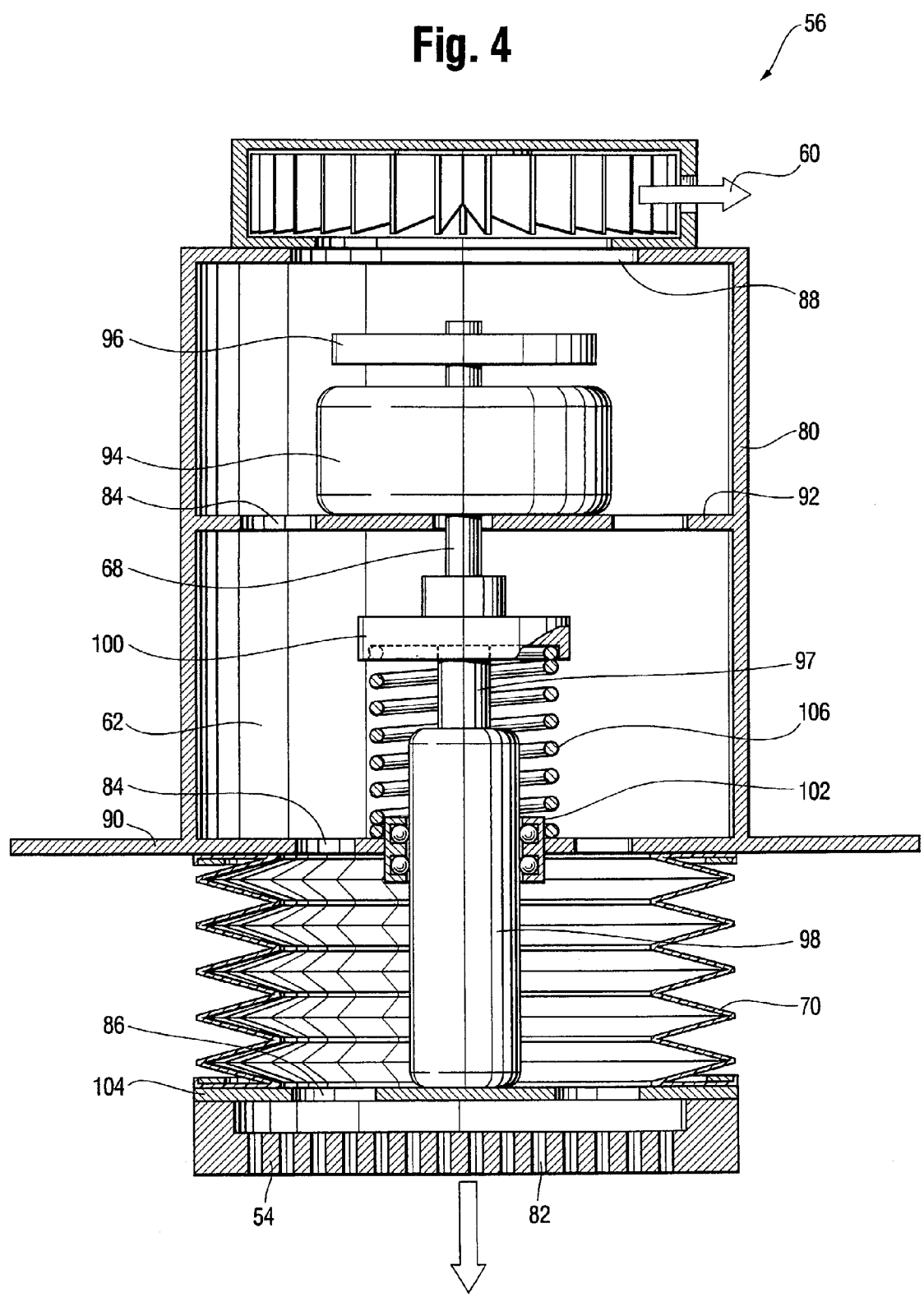
FIG. 4 is a front, sectional view of a portion of the thermal transfer printer shown in FIG. 3 detailing a tamping applicator mechanism.

FIG. 4 is a detailed sectional view of a portion of the tamping applicator mechanism 56 shown in FIG. 3. A sealed case 80 and sealed flexible bellows 70 form a closed plenum 62 that contains a partial vacuum to be applied to the printed media as it passes through the thermal transfer printer 48. The atmospheric pressure on the underside of the printed diecut label 26 thus causes the label to be temporarily adhered to the perforated vacuum guide plate 54.

The vacuum in plenum 62 is generated by a centrifugal fan 58 expelling air 60 sucked in through the holes 82 in the perforated vacuum guide plate 54, passing through internal vents 84 and 86 into blower inlet 88. The flexible bellows 70, attached both via a drive bracket 104 to the perforated vacuum guide plate 54 and a baseplate 90, allows the perforated vacuum guide plate 54 to move up and down while maintaining a sealed vacuum in plenum 62.

Baseplate 90 forms a part of the housing of the thermal transfer printer 48 and on which is mounted case 80. The tamping applicator mechanism 56 is mounted on a case bracket 92, and includes a two-part solenoid with fixed solenoid coil 94 attached to a case bracket 92, and solenoid plunger 68 that is attached to the gas spring plunger 97 via coupler 100. The body of gas spring 98 slides freely within a linear bearing 102 that is affixed to the perforated vacuum guideplate 54 indirectly through drive bracket 104 as shown. A return spring 106 between the movable coupler 100 and the fixed baseplate 90 provides a force to return the solenoid plunger 68 and iron disc 96 to their rest position when the solenoid coil 94 is de-energized.

One function of the gas spring 98 is to transfer a constant force to the vacuum guide plate 54 independently of the degree of plenum extension. The gas spring 98, acting together with return spring 106 and the driven mass, also provides viscous damping of the motion of the perforated vacuum guide plate 54, decoupling it from the snap action of the solenoid plunger 68 when the solenoid coil 94 is energized, pulling down iron disc 96. A gas damper or other viscous damper may alternatively be used in place of gas spring 98 to perform the same function.

Alternative design concepts are available for the tamping applicator mechanism if a compressed air source is available. The partial vacuum in plenum 62 may be generated by passing compressed air through a venturi. The tamping actuator may be an air cylinder, with a controlled airflow in said air cylinder replacing the function of the gas spring 98 in extending downward the perforated vacuum guide plate 54. Alternatively, tamping may be performed through use of an air blast through the perforated vacuum guide plate 54 onto the label in an alternate tamping applicator mechanism 56 with an non-extensible plenum 62.

Figure 5:
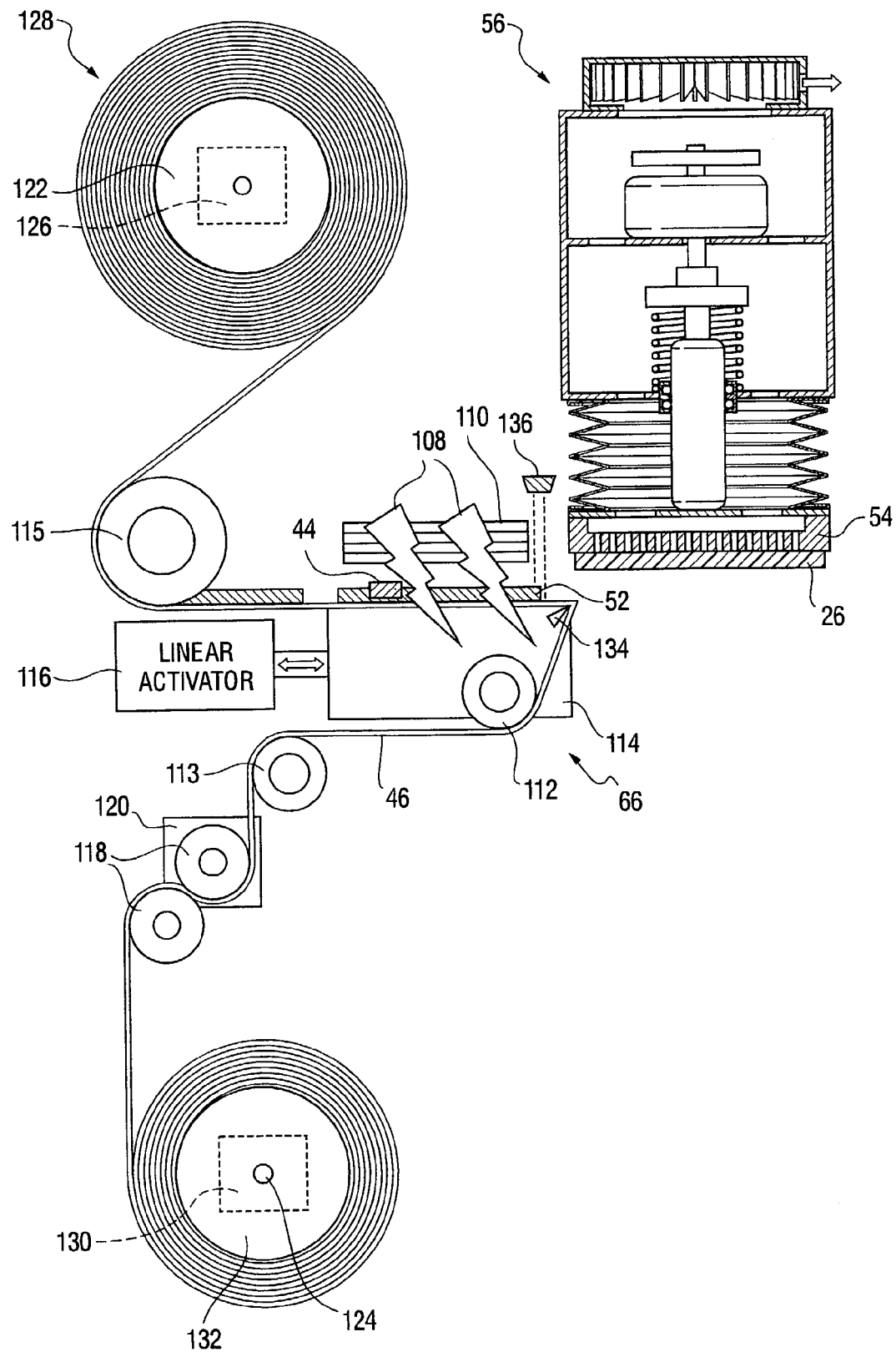
FIG. 5 is a front, sectional, schematic view of the thermal transfer printer shown in FIG. 3, wherein a transponder dispensing mechanism is disposed in a fully retracted initial position.

Referring to FIG. 5, a sectional, schematic view of the thermal transfer printer 48 shown in FIG. 3 is illustrated, wherein dispensing mechanism 66 is disposed in a fully retracted initial position. In the embodiment of the invention shown in FIG. 5, printer 48 includes utilizes an RF signal 108 that is emitted by transponder programmer antenna 110 to program the memory in RFID integrated circuit 44. In the fully retracted position shown in FIG. 5, the now-programmed RFID transponder 52 is positioned directly under the transponder programmer antenna 110.

The dispensing mechanism 66 comprises, in the illustrated embodiment of the present invention, among other things, transponder carrier rollers 112, 113, 115 a rigid guide plate 114, and a linear actuator 116. Linear actuator 116 extends and retracts the rigid guide plate 114 so that the now-programmed RFID transponder 52 is placed under the diecut label 26 in the desired insertion position.

To position the programmed transponder 52 properly under printed diecut label 26, a rolamite drive mechanism 118, that is turned by rolamite stepping motor 120, is synchronized with the motion of linear actuator 116 to adjust the movement of transponder inlay carrier 46. This motion is also synchronized with the motion of a transponder supply roll spindle 122 and an inlay carrier take-up spindle 124 of inlay carrier take-up spool 132. The supply roll drive 126 supplies both a computer-controlled unwind resistance and a braking function on transponder supply roll 128. The take-up roll drive 130, acting on the inlay carrier take-up spindle 124, maintains appropriate tension on inlay carrier 46 to prevent web slippage in the rolamite drive mechanism 118 that provides peeling tension for stripping the inlay carrier 46 from the programmed RFID transponder 52 at inlay carrier peeler bar 134.

A transponder position sensor 136 detects when a transponder 52 is appropriately placed under the transponder programmer antenna 110. The transponder position sensor 136 is part of the control electronics shown in FIG. 6, and is used to control the motion of the inlay carrier 46.

FIG. 6 is a schematic, block diagram of principal electronic components of the thermal transfer printer 48 that is shown in FIG. 3 having the capability of selective on demand application of a value-adding element to a media sample in accordance with the invention. In the illustrated embodiment of the invention, printer 48 includes a processor unit 138 with devices attached to a processor bus 140. The processor unit 138 executes a set of program instructions that are received from a user via printer I/O port 142 and that are stored in memory 144. As shown in FIG. 6, processor unit 138 is operatively electrically coupled through processor bus 140 to, among other things, platen roller drive 146 which drives platen roller 20; thermal printhead 18; transponder programmer 148 which is in turn connected to transponder programmer antenna 110; transponder position sensor 136; linear actuator 116; supply roll drive 126; rolamite stepping motor 120 which operate rolamite drive mechanism 118; inlay carrier take-up roll drive 130; and tamping solenoid 94.

Figure 7:
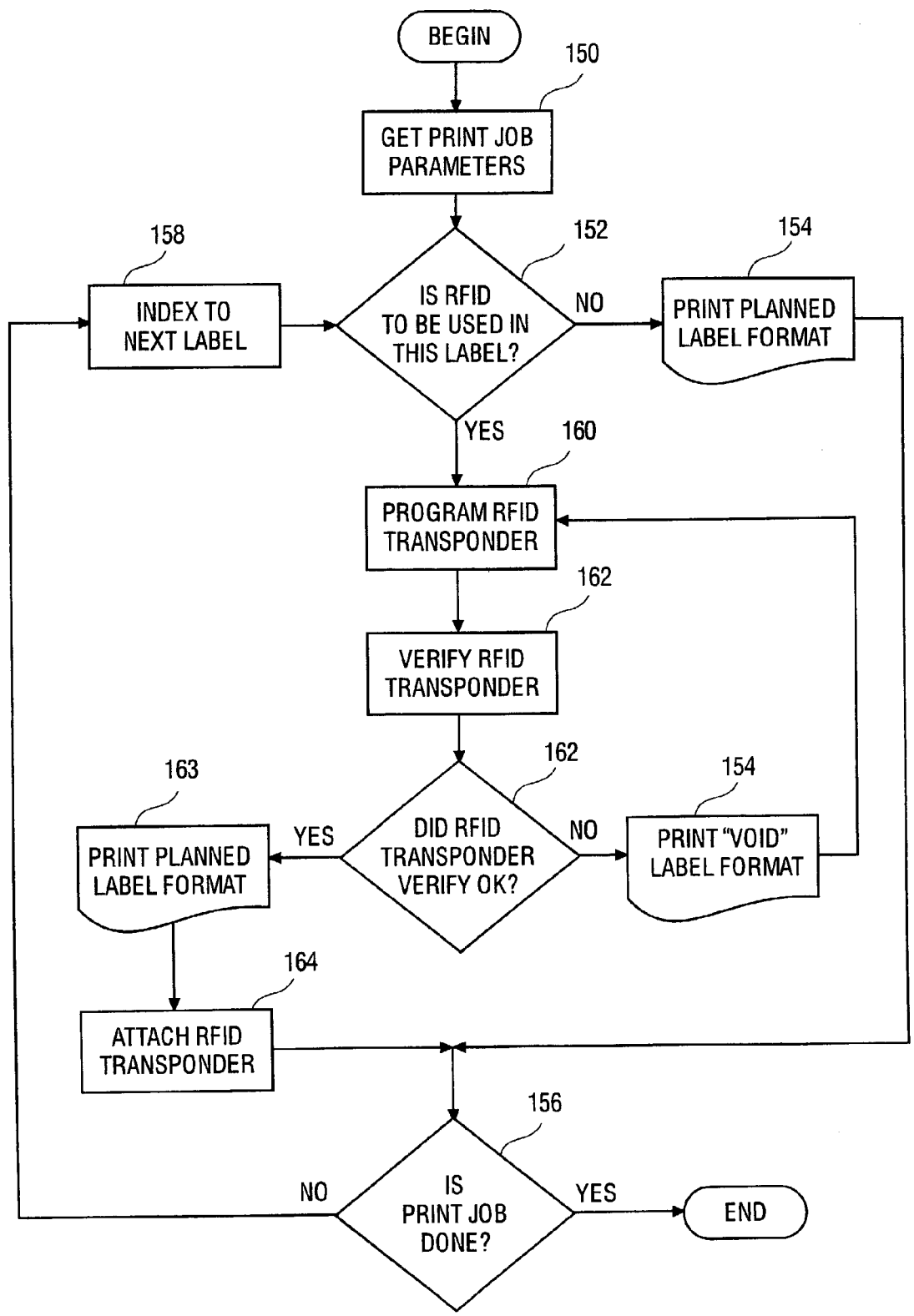
FIG. 7 is a program flow-chart that illustrates certain key program steps that are executed by the processor unit shown in FIG. 6 for each print job that is performed by the thermal transfer label printer shown in FIGS. 3–6.

FIG. 7 is a flow-chart that illustrates program steps that are executed by the processor unit 138 shown in FIG. 6 for each print job performed by the thermal transfer printer 48. Programming languages that are suitable for use in programming print jobs in connection with the present invention disclosed in this application include, for example, ZPL II® that is the universal language for printers that are manufactured by Zebra Technologies Corporation.

Processor 138 (FIG. 6) first retrieves the parameters of a print job that a user desires to have done on an on-demand or selective basis from memory 144 in process 150. For example, a user may store a set of instructions in the memory 144 that will cause printer 48 to print a batch of 100 diecut labels, wherein every other diecut label is to be a "smart label" provided with a programmed RFID transponder 52. It should be understood that all "on-demand" printing jobs are intended to be covered in connection with the present invention to the extent that such printing jobs include (in the presently discussed preferred execution of the invention) at least one smart label.

Referring back to FIG. 7, in program step 152, processor unit 138 (FIG. 6) determines whether or not a diecut label 14 that is to be printed is to have a programmed RFID transponder 52 attached to it. If not, then the printed diecut label 26 is formed in process 154. If the entire print job is determined to be completed in program step 156, then the program sequence is ended. If the print job is not done, then in process 158 both a new diecut label 14 is properly positioned under printhead 18 for the next printing cycle, and the label format is indexed. Then the processor unit 138 executes instructions to loop to program step 152.

If processor unit 138 determines in program step 152 that an RFID transponder is to be attached to a diecut label 14 that is to be printed, then an RFID transponder 52 is programmed in process 160, and then is verified as being operable and correctly programmed in process 162. If the programmed RFID transponder 52 is correctly verified, then the diecut label 14 is printed in process 163 to form printed diecut label 26, and then the programmed RFID transponder 52 is attached to the printed diecut label 26 in process 164 by operation of the value-adding mechanism 50. The processor unit 138 then executes program step 156 to see if the print job is performed as above. If the print job is not performed, then the media and label format are indexed in process 158, and the processor unit 138 then loops to program step 152.

Transponder programming and verification typically occurs prior to printing the media, so that a smart media with a defective transponder 52 can be identified by printing "void" on it, for example, rather than the normal label format as, for example, discussed above. The printer 48 then typically ejects the defective smart label, and automatically repeats the process until a fully functional smart label with a properly encoded transponder and the correct label format is produced. This ensures that the integrity of the batch of labels that a user desires to manufacture in connection with a particular on-demand print job is accurately made. To wit, if in verification process 162 the processor unit 138 determines that the programmed RFID transponder 52 is not operable, then it may be disposed of directly. Alternatively, a suitable indicia such as, for example, "VOID" is printed in process 163 on the diecut label 26, and the inoperable RFID transponder 52 is attached to the "VOID" printed label in process 164 in order to expel the properly-identified defective transponder 52 from the printer 48. The processor unit 138 loops in processes 160 and 162, etc., to program and verify a new RFID transponder 52, printing an appropriate diecut label 26 and attaching them together in process 164 continues until a correctly printed diecut label 26 with an embedded, verified, programmed RFID transponder 52 is completed. Then the program continues by testing if the print job is complete in program step 156.

Figure 8:
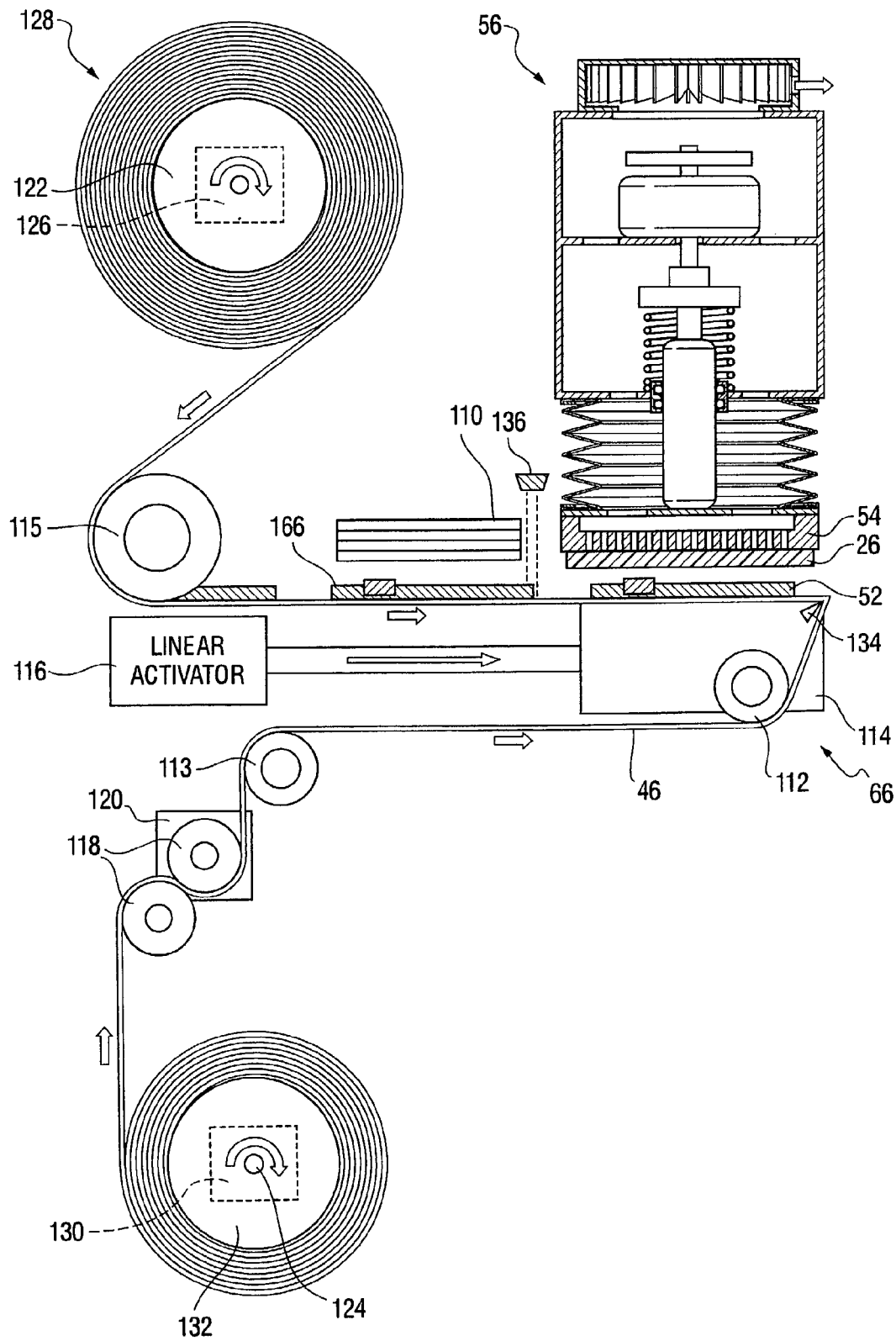
FIG. 8 is a front, sectional, schematic view of the thermal transfer printer shown in FIG. 3, wherein the transponder dispensing mechanism shown in FIG. 5 is disposed in an extended position so that an RFID transponder is positioned in a desired position and orientation with respect to a delaminated diecut label printed by the thermal transfer printer.
Figure 9:
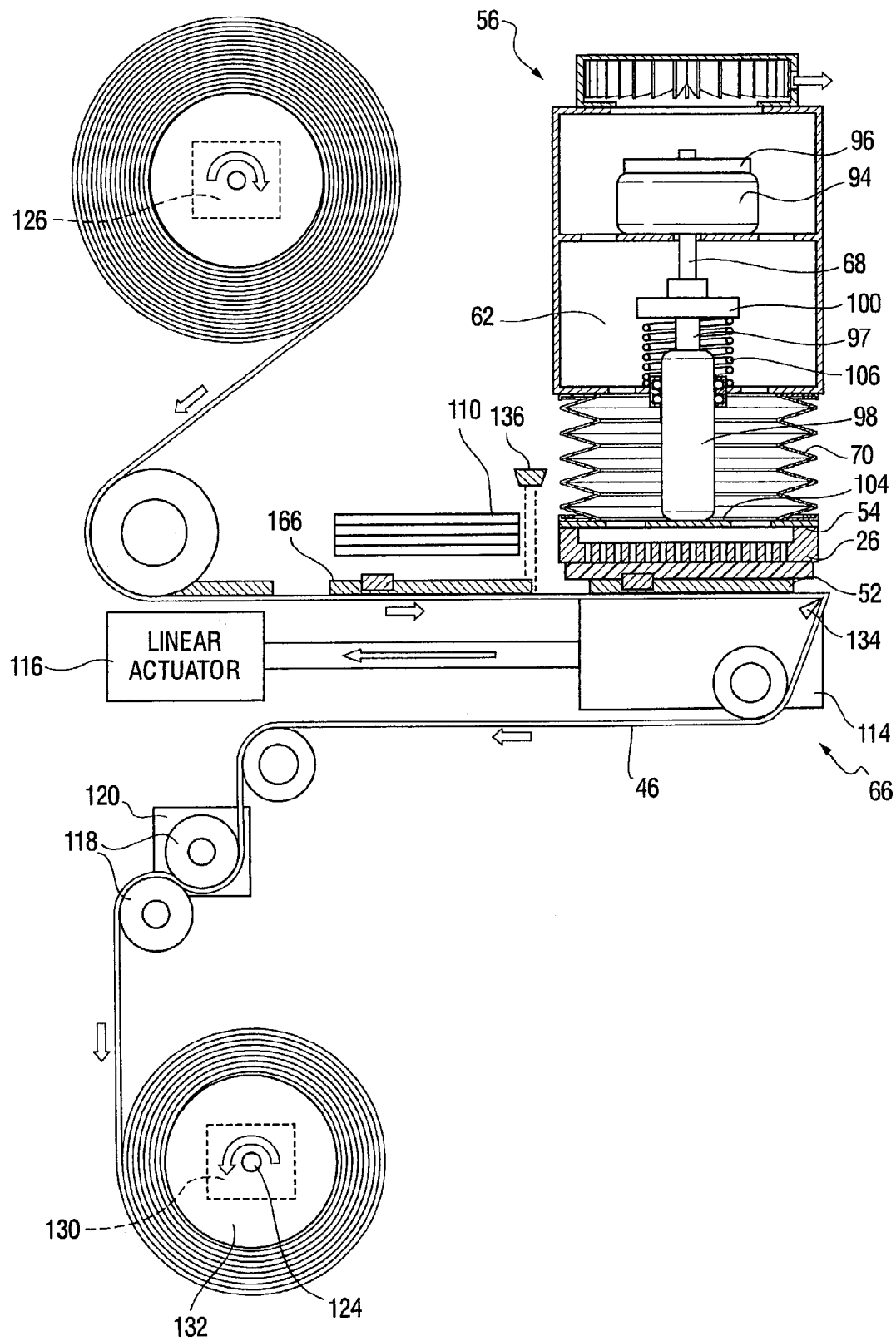
FIG. 9 is a front, sectional, schematic view of the thermal transfer printer shown in FIG. 5, wherein the tamping applicator mechanism detailed in FIG. 4 is utilized to permanently affix a programmed RFID transponder to a media sample that is to be printed by the thermal transfer printer mechanism and wherein a linear actuator is used to retract the dispensing mechanism to peel the inlay carrier from the back of the programmed transponder thereby exposing its adhesive layer.
Figure 10:
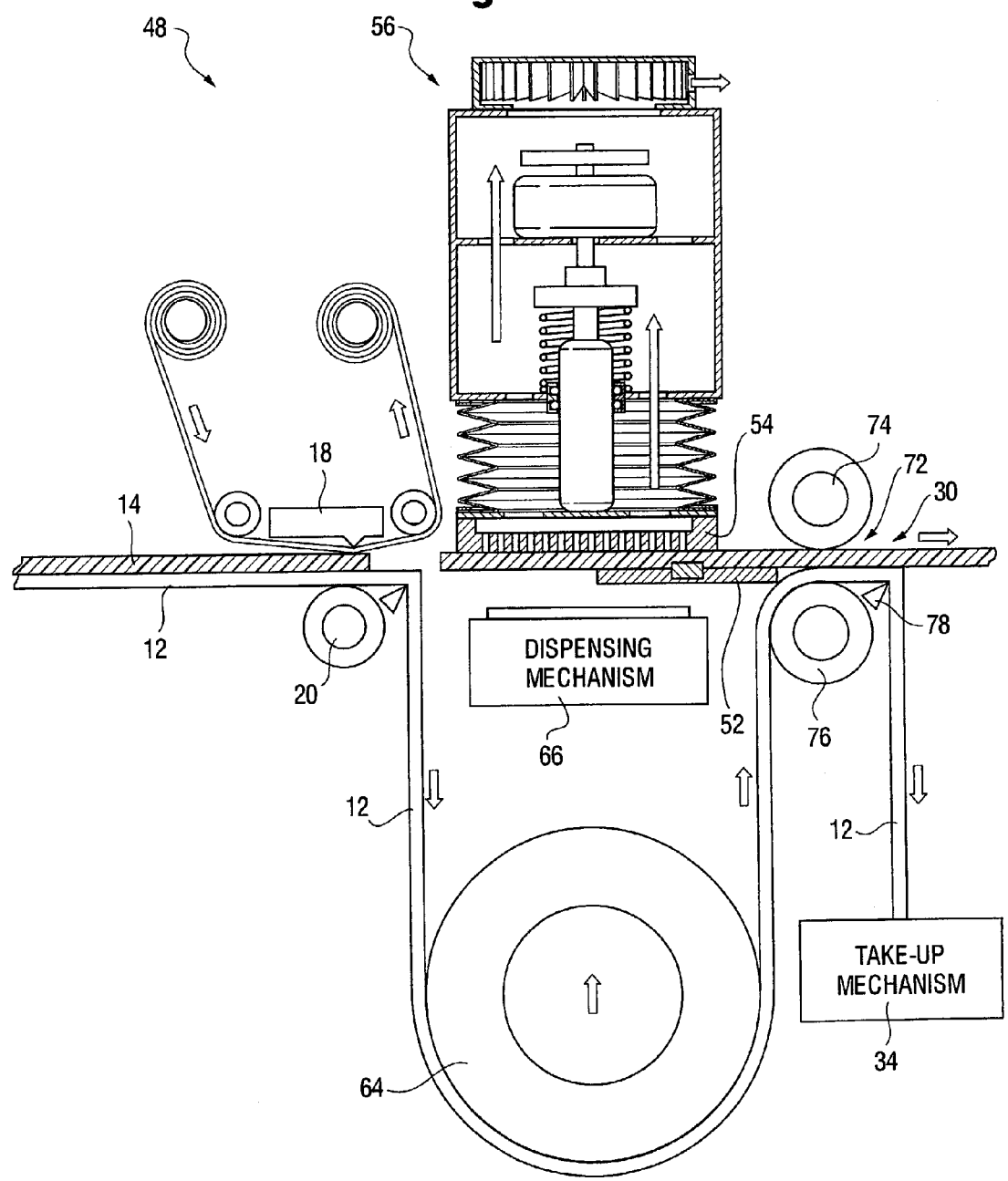
FIG. 10 is a side, sectional, schematic view of the thermal transfer printer shown in FIG. 3, wherein a diecut label/programmed transponder sandwich is formed and relaminated to the diecut label carrier.

FIGS. 8–10 illustrate one example of a process for selectively and on demand attaching a programmed RFID transponder 52, or any other suitable value-adding element, to printed diecut label 26 (step 164 in FIG. 7) or other media sample. The processor unit 138 (FIG. 6) causes the linear actuator 116 to extend and causes the supply roll drive 126 to unwind the transponder supply spool 128, while rolamite stepping motor 120 and take-up roll drive 130 also unwind an approximately equal amount of inlay carrier 46. This continues until a new, unprogrammed RFID transponder 166 is positioned properly within transponder position sensor 136.

In FIG. 9, the processor unit 138 (FIG. 6) now activates the tamping applicator mechanism 56. By applying an electric current to solenoid coil 94, the magnetic force on iron disc 96 actuates solenoid plunger 68, which, acting through coupler 104, and gas spring plunger 97, thus compresses gas spring 98. A nearly constant tamping force independent of extension is transmitted by the body of gas spring 98 onto drive bracket 104 that extends the flexible bellows 70 and thus plenum 62. This causes the rigid perforated vacuum guide plate 54 to press the adhesive side of printed diecut label 26 against the programmed transponder 52, using the rigid guide plate 114 as an anvil. This adheres the programmed RFID transponder 52 to the printed diecut label 26.

Once tamping takes place as, for example, described above, the processing unit 138 now causes the linear actuator 116 to retract, while keeping the supply roll drive 126 braked so that the new unprogrammed RFID transponder 166 remains fixed under transponder position sensor 136. The processor unit 138 activates rolamite stepping motor 120 in coordination with the motion of the linear actuator 116, so that rolamite stepping motor 120 acts through rolamite drive mechanism 118 to takes up and maintains tension on the excess inlay carrier 46. Tension on the rolamite drive mechanism is maintained by energizing the take-up roll drive 130, which also causes the excess inlay carrier 46 to wind onto the take-up roll spindle 124.

The retracting motion of the linear actuator 116 on the guide plate 114 together with the tension on inlay carrier 46, aids in peeling the inlay carrier 46 at the inlay carrier peeler bar 134 from the adhesive layer on the bottom of programmed RFID transponder 52, which is now adhered to the printed diecut label 26. This peeling process continues until the guide plate 114 plate is completely retracted to the position shown in FIG. 5. The new, unprogrammed RFID transponder 166 is now properly positioned under transponder programmed antenna 110 for immediate programming.

Now that the programmed RFID transponder 52 has been bonded to the printed diecut label 26, the processor unit 138 deactivates tamping applicator mechanism 56, which retracts under the force of return spring 106.

In FIG. 10, the diecut label/transponder smart label sandwich (26/52) is advanced by the platen roller 20, slides across the smooth perforated vacuum plate 54 until the next, unprinted diecut label 14 is positioned under printhead 18 for the next printing cycle. Driving of the sandwich (26/52) continues by the driven nip roller 76, and relamination with the label carrier 12 occurs in nip 72. The production of the printed and programmed RFID smart labels with embedded programmed RFID transponder 52 is now finished, and the laminated smart label (26/52/12) is delivered at label exit 30. As shown, label carrier 12 may also be optionally peeled away from the printed smart label (26/52) in a manner similar to that described in FIG. 1.

Alternatively, the label carrier 12 delaminated at 32 (FIG. 3) may be removed from the system by, for example, utilization of a take-up mechanism that is similar to 34. In this example, a second supply roll of label carrier 12 may be used for relamination of the label sandwich (26/25/12) at nip 72, and the buffer loop roller 64 eliminated.

FIGS. 11–15 illustrate an exemplary modification of the thermal transfer printer 48 (as shown FIG. 3) that is designed for use with tickets, tags, plastics cards, and other stiff media that does not contain an adhesive layer. This ticket and tag printer 168 comprises thermal transfer printing mechanism 10; tamping applicator mechanism 56; dispensing mechanism 66 and cutter mechanism 170. The embodiment shown in FIGS. 11–15 also is useful for applying a self-adhesive transponder to a surface of a printed self-adhesive label Note that the items that are illustrated in the FIGS. 3–10 embodiment but are not specifically shown in FIGS. 11–13 may be present in an actual product that incorporates all or some of the inventions disclosed in the totality of FIGS. 3–14. However, since said not shown components do not have a role in the further exemplary embodiment illustrated in FIGS. 11–14, they are, therefore, are not shown in FIGS. 11–14 for purposes of simplicity.

Figure 11:
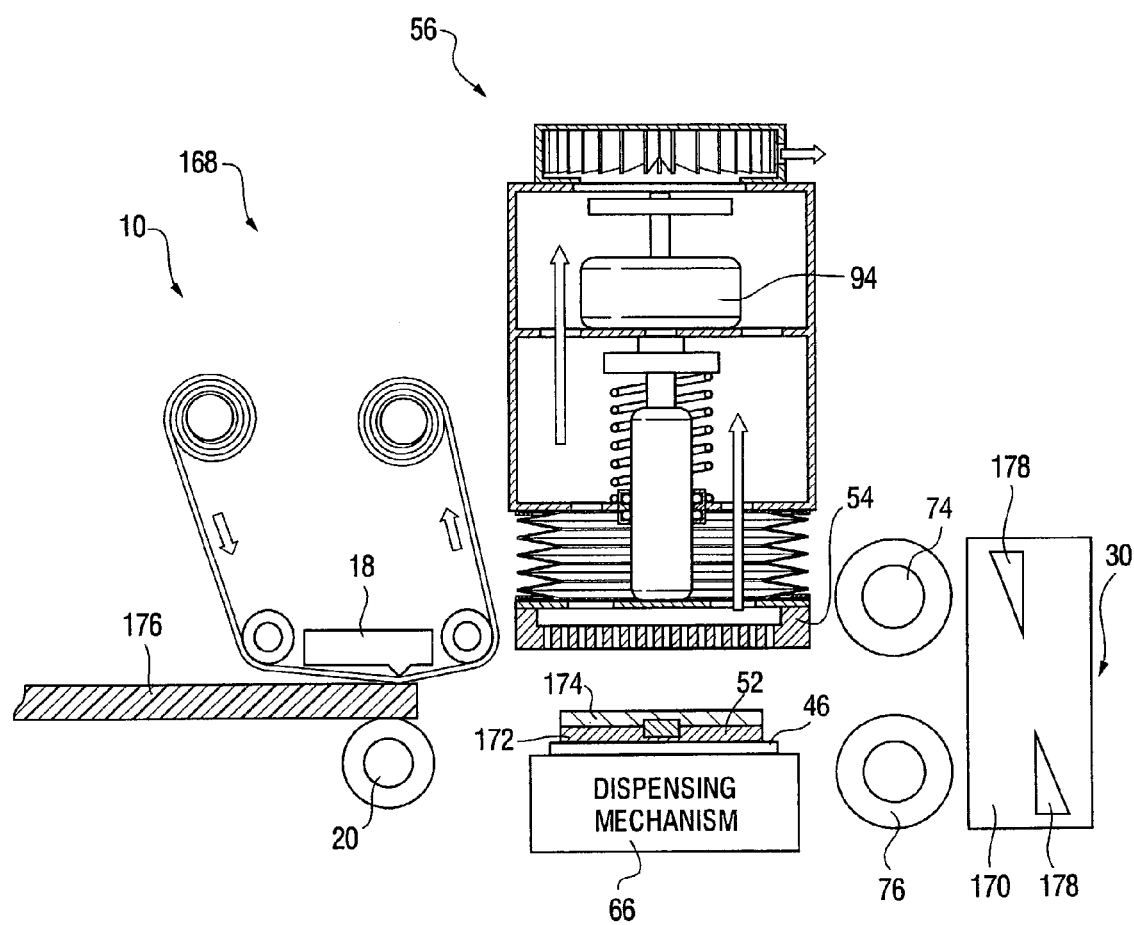
FIG. 11 is a side schematic view of a thermal transfer printer mechanism, similar to that disclosed in FIG. 3, that incorporates a number of aspects of a further exemplary embodiment of the present invention disclosed in this application, and that allows adhesive-backed value-adding devices such as RFID transponders to be affixed to stiff media that does not include its own adhesive layer.

Referring to FIG. 11, the programmed RFID transponder 52 is itself formed as a transponder label 172 by adhering a diecut transponder facestock 174 to the top surface of the adhesive-backed, programmed RFID transponder 52 on inlay carrier 46. As stiff media 176 often is supplied in continuous form, it may be optionally cut to length after printing. An optional cutter 170, including cutter blades 178, is shown in FIG. 11 between the nip rollers 74, 76 and media exit 30. The electrically-operated cutter mechanism 170 is additionally connected through the processor bus 140 (FIG. 6) to processor unit 138 (FIG. 6) as part of thermal transfer ticket and tag printer 138.

Figure 12:
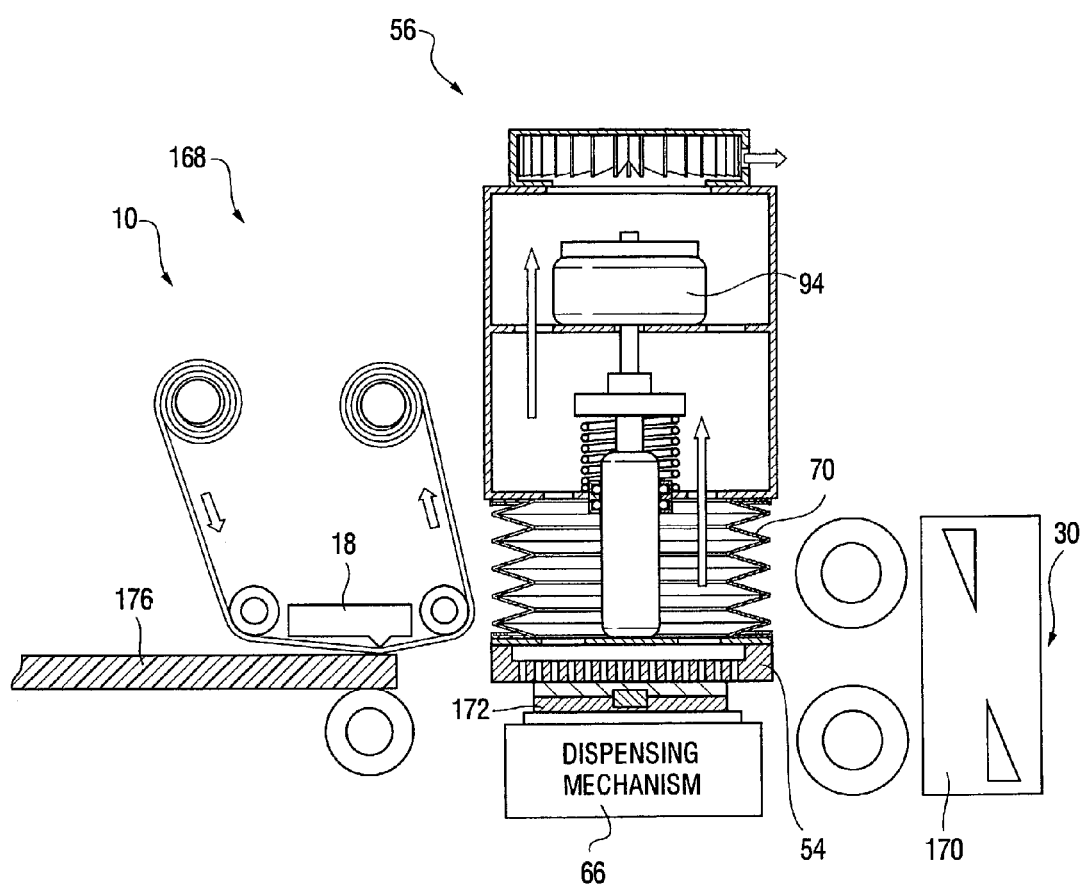
FIG. 12 is a side schematic view of the thermal transfer printer shown in FIG. 11, wherein an adhesive-backed, programmed RFID transponder is disposed in a dispensing position with respect to the value-adding mechanism.

In FIG. 12, the tamping applicator mechanism 56 is extended in a manner similar to the description for FIG. 9. The processing unit 138 (FIG. 6) energizes the solenoid coil 94 of the tamping applicator mechanism 56, which extends the flexible bellows 70 and presses the perforated vacuum guide plate 54 against the transponder label 172. In a manner similar to FIG. 9, a guide plate (not shown) of the dispensing mechanism 66 then is retracted, peeling the inlay carrier 46 away from the transponder label 172 at inlay carrier peeler bar 134 (see FIG. 9), thereby leaving the lower adhesive surface of transponder label 172 exposed.

Figure 13:
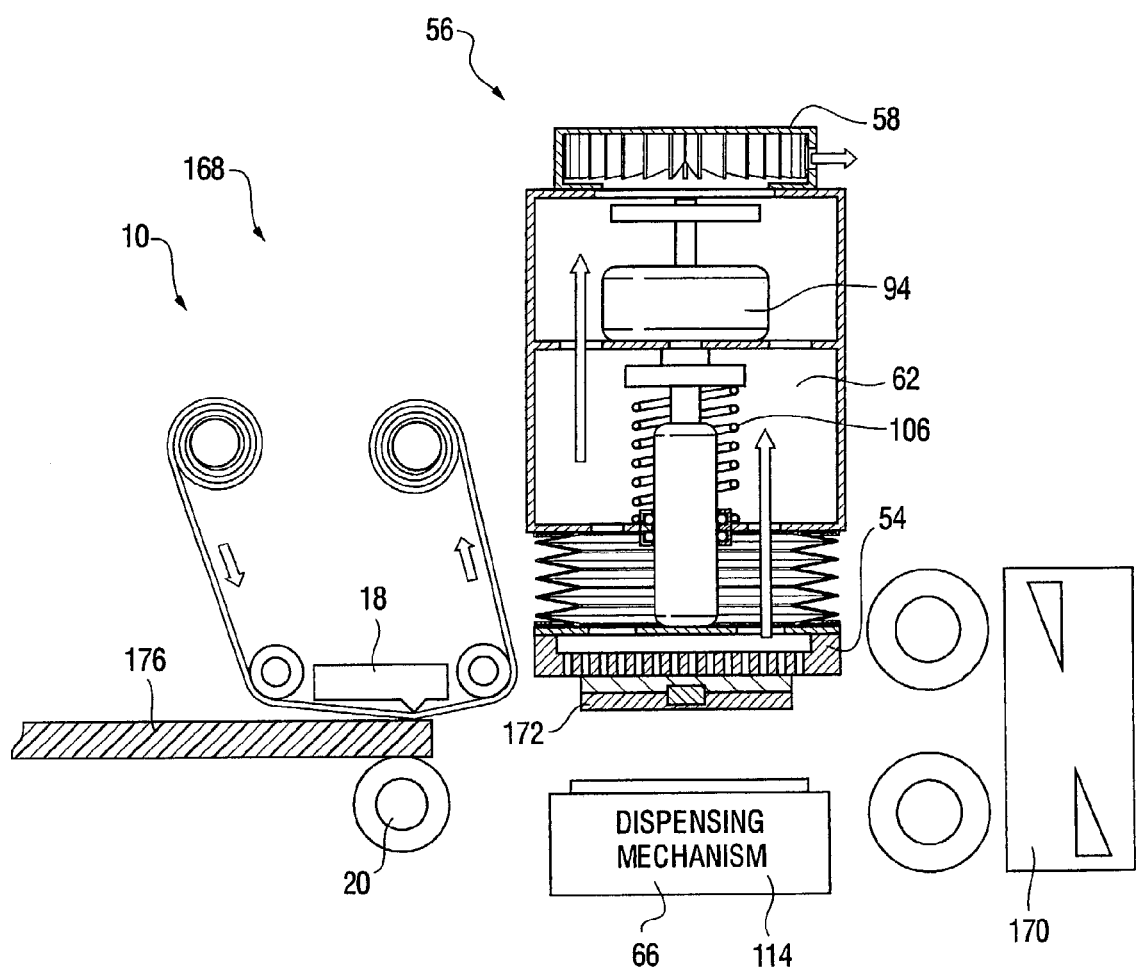
FIG. 13 is a side schematic view of the thermal transfer printer shown in FIG. 11, wherein an adhesive-backed, programmed RFID transponder is affixed to a stiff media.

In FIG. 13, when solenoid coil 94 is deenergized, the tamping applicator mechanism 56 is then fully retracted by spring 106, with transponder label 172 remaining held against the perforated vacuum guide plate 54 by the vacuum force generated by centrifugal fan 58. The exposed lower adhesive surface of the transponder label 172 is now positioned above the path of stiff media 176.

The stiff media 176 (which can be a ticket, tag, plastic card, laminated label stock, or the like) is now printed and dispensed forward by platen roller 20 to the point where the transponder label 170 is to be placed on it. See FIG. 14. When the printed stiff media 176 is in the correct position, tamping applicator mechanism 56 presses the transponder label 172 onto the printed stiff media 176. Note that the during the tamping process, the guide plate of dispensing mechanism 66 may be optionally extended under the printed stiff media 176 so that rigid guide plate 114 acts as an anvil for the tamping applicator mechanism 56.

Figure 14:
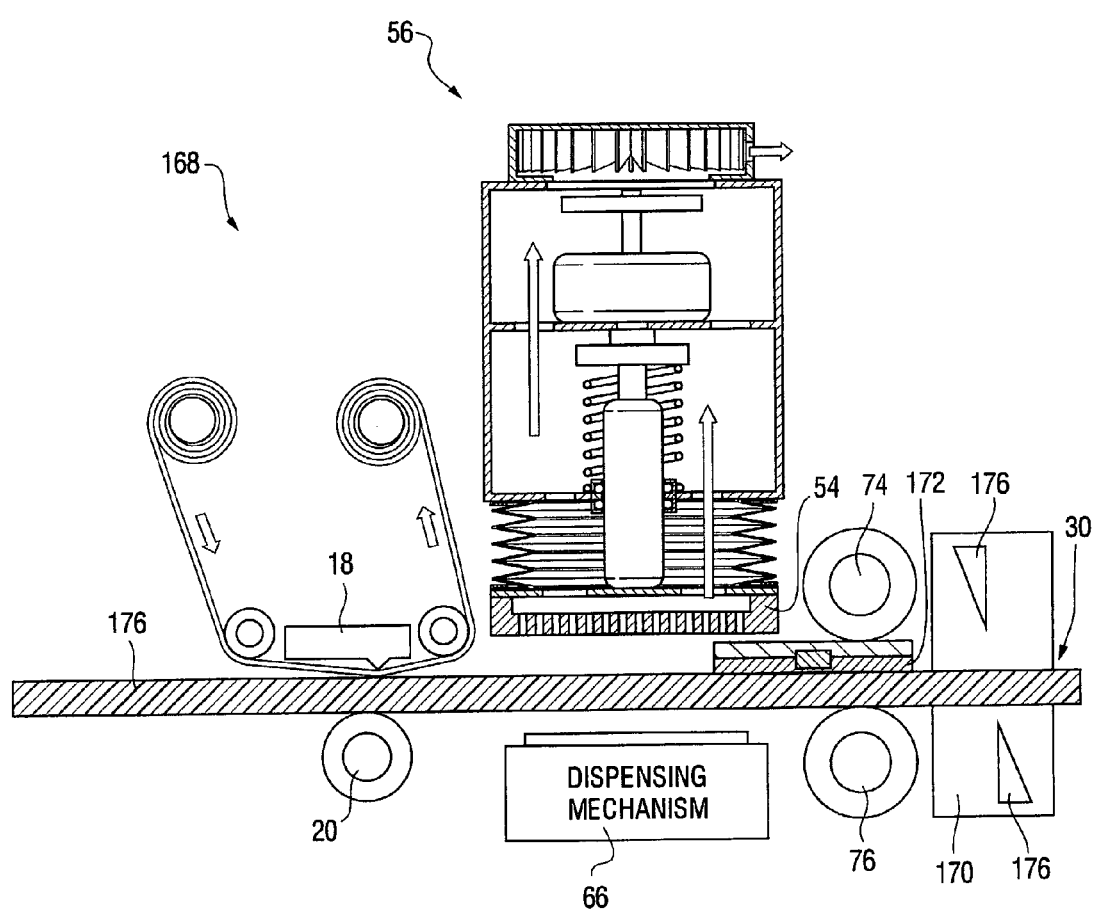
FIG. 14 is a side schematic view of the thermal transfer printer shown in FIG. 11, wherein the stiff media, upon which an adhesive-backed, programmed RFID transponder is affixed, is advanced to a dispensing position.

In FIG. 14, the transponder label/printed stiff media sandwich (172/176) now continues forward through the nip rollers 74 and 76, where the transponder label 172 is permanently bonded to the printed stiff media 176 by the compression provided by nip rollers 74 and 76. Then, if discrete stiff media 176 are used in forming the transponder/media sandwich (172/176), the sandwich is ejected through media exit 30.

Figure 15:
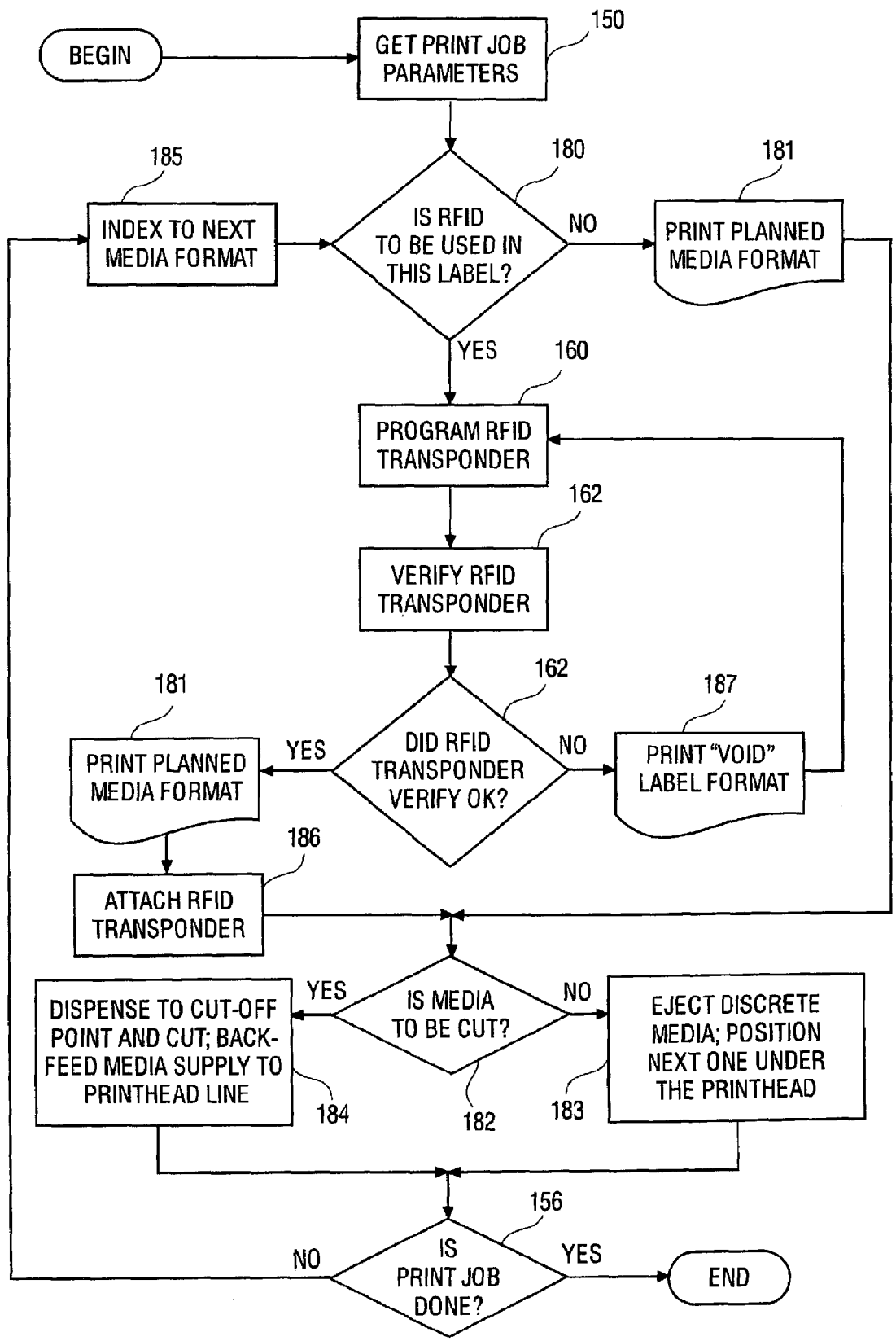
FIG. 15 is a flow-chart that illustrates certain key program steps that are executed by the processor unit shown in FIG. 6 for each print job that is performed by the thermal transfer printer shown in FIGS. 11–14.

In the case of continuous stiff media 176, the stiff media trailing the transponder media sandwich (172/176) may be optionally cut to length using the cutter mechanism 170. This is accomplished under control of the print job software, as shown in FIG. 15, by, for example, processor unit 138 activating electrically-controlled cutter blades 178. In that case, the cutoff length of smart ticket or tag exits at 30, and remaining the stiff media 16 is retracted by platen roller 20 to its position it under the printhead 18 for the start of the next printing cycle.

FIG. 15 is a flow-chart that illustrates program steps that are executed by the processor unit 138 shown in FIG. 6 for each print job performed by the thermal transfer printer 48. Note that many of the program steps and processes in FIG. 15 for selective on demand printing and application of a value-adding element are the same as or similar to those in the flow chart of FIG. 7. The processor unit 138 first retrieves the parameters of a print job that a user desires to have performed on an on-demand basis from memory 144 in process step 150. For example, a user may store a set of instructions in the memory 144 (FIG. 6) that will cause ticket and tag printer 168 to print a batch of 21 tickets from a roll of continuous stiff media 176, wherein only the first ticket is to be a "smart ticket" provided with a programmed RFID transponder label 172. It should be understood that all "on-demand" printing jobs are intended to be covered in connection with the present invention to the extent that such printing jobs include (in the described preferred execution of the invention) at least one smart ticket or tag.

Referring to FIG. 15, processor unit 138 (FIG. 6) determines in program step 180 whether or not a stiff media sample that is to be printed is to have a programmed RFID transponder label 172 attached to it. If not, then the printed ticket is just formed in process 181. In program step 182, it is determined if the media sample is to be cut. When discrete media such as plastic cards are used, then in process 183 the finished media sample is simply ejected at the media exit 30, and a new media sample is positioned under the printhead 18 for the next printing cycle.

When printed continuous stiff media is to be cut, then in process 184 the continuous stiff media 176 is positioned to the cut-off point between cutter blades 178 of cutter mechanism 170. The processor unit 138 the activates the electrically-operated cutter mechanism 170 to cut off the printed ticket, tag, smart ticket or smart tag for the stiff media supply and deliver it at media exit 30. The continuous stiff media is then backfed using the platen roller 20 to the start of print position under printhead 18 for the next print cycle.

If the entire print job is determined to be completed in step 156, then the program sequence is ended. If the print job is not done, then the media print format is indexed in step 185, and then the processor unit 138 loops to program step 180.

If processor unit 138 determines in program step 180 that an RFID transponder is to be attached to the next ticket or tag that is to be printed, then an RFID transponder label 172 is programmed in process 160, and then is verified as being operable and correctly programmed in process 162. If the programmed RFID transponder label 172 is correctly verified, then the ticket or tag is printed in process 181, and then the programmed RFID transponder label is attached to the printed media sample by operation of the value-adding mechanism 50 in process 186. The processor unit 138 then executes program step 182 to see if the media is to be cut, taking the appropriate action as described above; then program step 156 to print job is done, also as described above.

Transponder programming and verification typically occurs prior to printing the media, so that a smart media with a defective transponder label 170 can be identified by printing "void" on it in step 187 rather than the normal media format 181. The ticket or tag printer 168 then typically ejects the defective smart ticket or tag at media exit 30, and automatically repeats processes 160 and 162, etc., until a fully-functional smart ticket or tag with a properly encoded transponder and the correct printed media format is produced, in a manner similar to that as described in FIG. 7.

Additionally, a variation of the embodiment shown in FIGS. 11–15 may be used to actually form transponders by printing a conductive antenna on the media sample and then attaching labels comprised of RFID integrated circuits with electrical contacts to that antenna (for example the Motorola BiStatix™ "interposer"; and those made by Marconi using an Intermec Intellitag® 900 MHz or 2.45 GHz RFID integrated circuit).

Figure 16A:
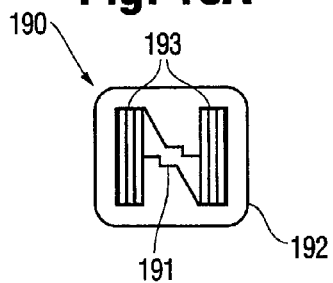
FIGS. 16A though 16D are schematic views of two types of RFID integrated circuit labels and their attachment to two corresponding types of printed antennae in order to form actual RFID transponders in a process using an exemplary variation of the thermal transfer printer shown in FIGS. 11–15.
Figure 16C:
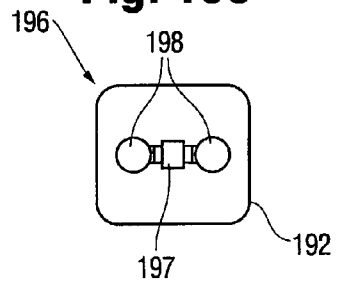
Figure 16B:
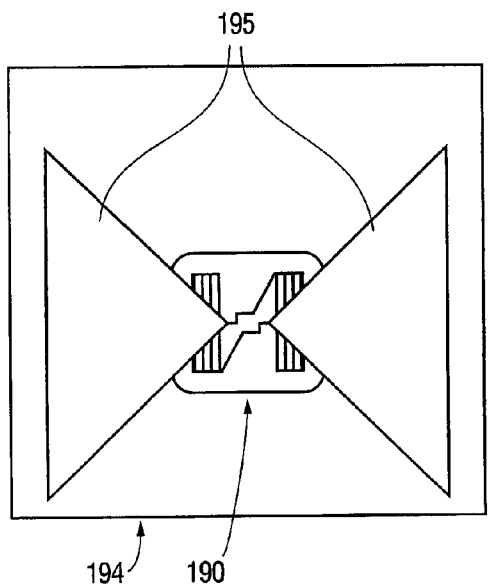

For example, in FIG. 16A a BiStatix label 190 based on Motorola BiStatix™ integrated circuit 191 is formed on transparent nonconductive label stock 192 by first forming two conductive mounting pads 193 and bonding them to two antenna contacts on Motorola BiStatix™ integrated circuit 191. These BiStatix labels 190 in roll form are used as transponder supply roll 128 in ticket and tag printer 168. During the printing process, by proper choice of thermal transfer ribbon 16 and nonconductive media 194, two printed conductive carbon antenna panels 195 can be formed on the ticket or tag. The value-adding mechanism 50 can be used to attach the conductive mounting pads 193 of each BiStatix label 190 to the two printed conductive carbon antenna panels 195 to form a complete RFID transponder, as shown in FIG. 16B. By proper placement of the transponder programmer antenna 110, the electrostatic-coupled RFID transponder so formed then may be programmed.

Figure 16D:
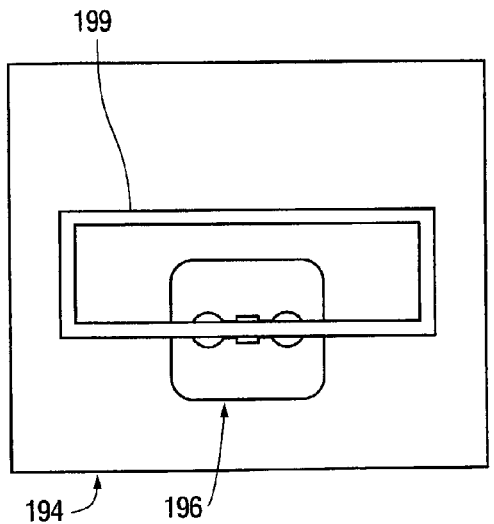

More conventional magnetically- or electromagnetically-coupled transponders also may be formed this way. In FIG. 16C, a 2.45 GHz RFID Intellitag label 196 based on an Intermec Intellitag® integrated circuit 197 is formed on transparent nonconductive label stock 192 by with two metal contacts 198 bonded to the two antenna contacts on an Intermec Intellitag® integrated circuit 197. A rolls of these Intellitag labels 196 is used as transponder supply roll 128 in ticket and tag printer 168. During the printing process, by proper choice of thermal transfer ribbon 16 and nonconductive media 194, a 2.45 GHz conductive silver ink folded dipole antenna 199 can be formed. The value-adding mechanism 50 can be used to attach the two metal contacts 198 of the Intellitag label 196 to the ends of the conductive silver ink folded dipole antenna panels 199 to form a complete RFID transponder, as shown in FIG. 16D. By proper placement of the transponder programmer antenna 110, the electromagnetically-coupled transponder so formed then may be programmed.

The present invention provides a number of distinct advantages, either individually and/or collectively. A number of such advantages include, for example, the following.

1. The ability to selectively add an RFID transponder to a conventional on-demand printed media sample under program control, thereby converting a conventional label into a "smart" RFID enhanced media sample;
2. The ability to selectively create an RFID transponder using a printed antenna and applied RFID integrated circuit on a conventional on-demand printed media sample under program control, thereby converting a conventional label into a "smart" RFID enhanced media sample;
3. The ability to provide a single label, ticket tag or plastic card printer that can produce, on-demand, either conventional or "smart" RFID media using the same conventional label, ticket, tag stock or cards; and
4. The elimination of the need for pre-converted RFID smart media, thereby removing the attendant cost of these items being specially produced by a label converter and inventoried by the user.

Additional advantages of the present invention include the following.

5. The impact of the "lumpy" transponder on print quality in producing a smart media sample is eliminated because printing of the media is done before the RFID transponder is embedded in or adhered onto the final media sample;
6. The ability to design an add-on option to a conventional label, ticket, tag or plastic card printer to enhance it to produce smart labels, tickets, tags or plastic cards on an as-needed basis;
7. The ability to cause a single printer to produce either conventional or smart media using conventional media supplies as a basis (as the smart media can be produced only when needed using the on-demand basis label format software control);
8. The removal of the need for a label converter to provide special rolls of smart labels for on-demand printers, with the attendant extra costs of making and inventorying special smart label stock.
9. The removal of the need for the user to have a separate thermal transfer printer to produce smart labels;
10. The elimination of user dependence on smart label converters, thereby allowing the user to use their existing converter;
11. The allowance of designs that permit all printers in a product line to generate, on an on-demand, program-controlled basis, both conventional labels, tickets, tags and cards, and also smart labels, tickets, tags and cards;
12. The reduction of the cost overhead and complexity barriers of adding smart label capability to an existing conventional labeling process. Still further advantages and benefits follow; and
13. And, more generally, the ability to provide a single label, ticket tag or plastic card printer or other media processor that can selectively and on-demand apply a value-adding element to a standard label, ticket, tag or card or other media sample As described above in the list of advantages, the invention makes possible a truly on demand, custom configuration of any selected one, or all, of the media to have an RFID transponder of a particular type or capability, programmed with particular data, and preprinted or post-printed or otherwise processed. This implies that end users do not have to install a variety of printers or other systems in order to take care of the requirements of various customers or applications. Since entire rolls of unprinted smart labels (each possibly having a different material, adhesive, label form factor or type of transponder) do not have to be stocked, the cost savings are significant. The capital and maintenance costs of single purpose lines or machines is avoided. Since the entire process is under computer program control, errors which inevitably result in manual changeover from plain labels to RFID labels, for example, is eliminated. One machine or system can now handle all needs In a more general sense, the present invention concerns a method of configuring on demand a series of labels, tickets, tags, cards or other media. The method comprises feeding a series of media which may be alike or different, and, on demand, selectively applying, inserting, or otherwise associating with certain media but not with other media in the series one or more discrete, value-adding elements. In the described preferred embodiment the elements are RFID transponders, however, as will be described, other value-adding elements may be associated with the selected media.

Figure 18:
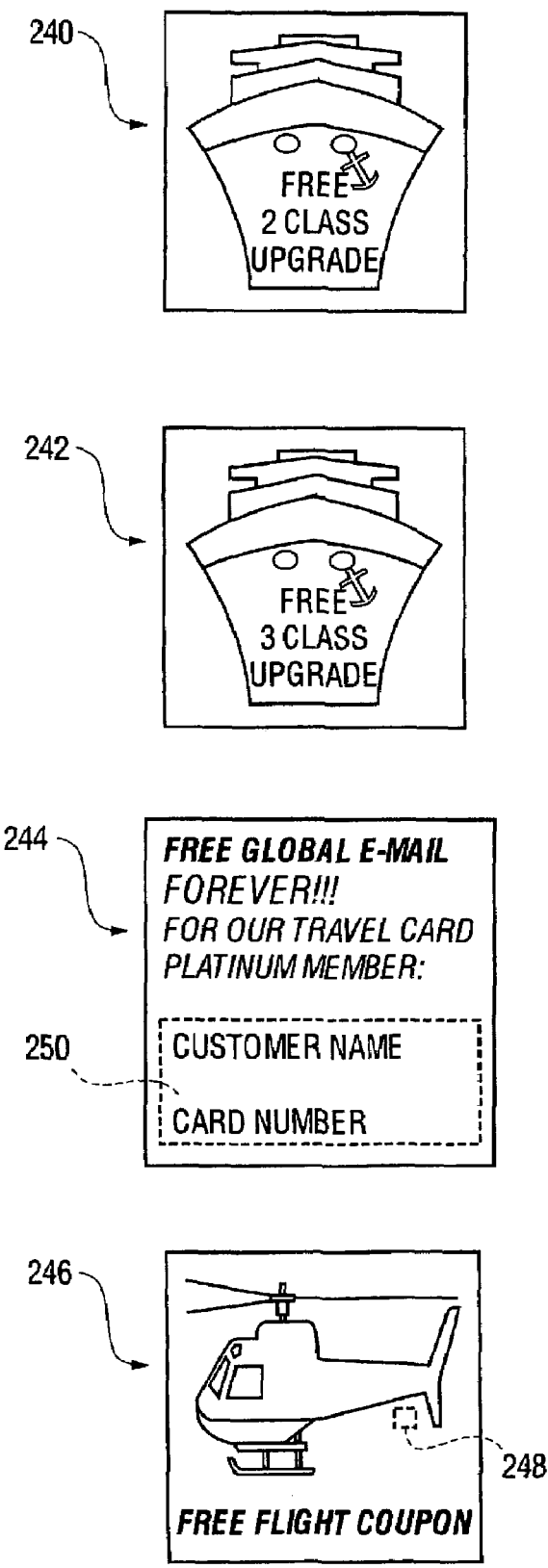
FIG. 18 is a representation of the four value-added elements which are added in certain combinations to the postcard set media of FIG. 17 by the exemplary production process that is shown in FIG. 19.
Figure 19:
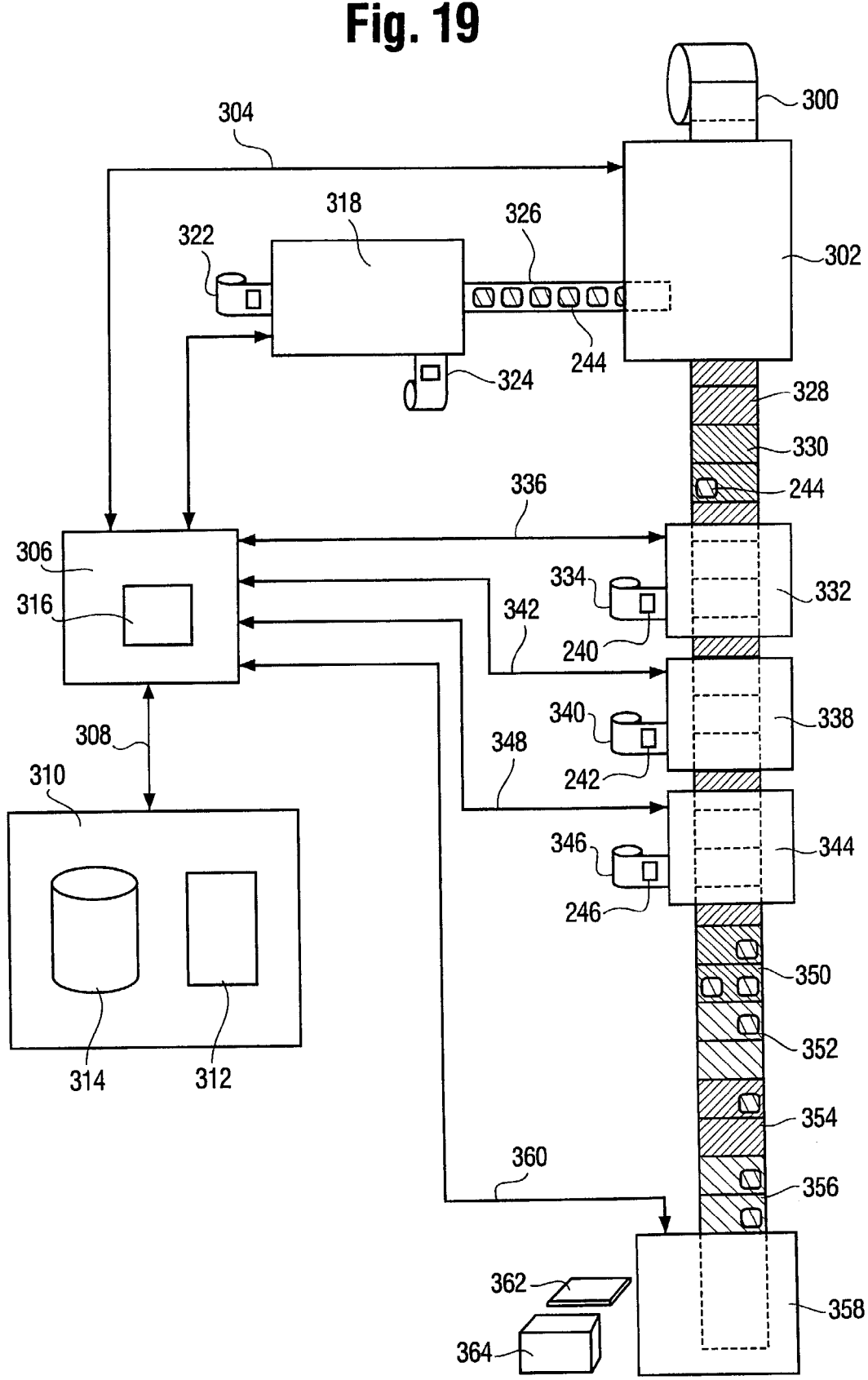
FIG. 19 is an overhead schematic view of an exemplary production process incorporating forms of two exemplary embodiments invention embodiments that is used for selectively and on-demand configuring the postcard media of FIG. 17 by addition of one or more value-added elements of FIG. 18.

A third embodiment illustrating the more general nature of the on-demand configuration process for media is the application shown in FIGS. 17–19. With the advent of "mass customization" marketing, and the developments in prospect-specific data resources available today, it is possible to narrowly target a very specific group of prospects, about which much is known concerning their identification, attributes, predilections, purchasing habits and other personal characteristics. The present invention gives total flexibility in appealing to particular purchasing interests and other characteristics of a particular set of prospects or past customers.

In this illustrative hypothetical application, Travel Card Company wishes to send custom configured promotional media to a selected customer base. Its customers consist of three classes: Green, Gold and Platinum card members. Green Members are occasional travelers, mostly for vacations, and comprise the lowest category of card usage. Gold Members use the card frequently, primarily for business, but often take vacations abroad, and represent a smaller population with much higher usage than Green Members, and as a class represent most of the travel dollars spent with Travel Card Company. Platinum Members are a much smaller class, with an average annual card usage five times that of Gold Members, mostly spent on international travel, using first class airfare and luxury hotels and restaurants; they often mix business and pleasure travel, and they often travel with spouses or "significant others." They are highly desirable customers for the luxury class travel and merchandise companies.

The promotional media is here a custom postcard set 200 as shown in postcard set front 202 and postcard set reverse side 204 in FIGS. 17A and 17B, comprised of customer addressed postcard with detachable return postcard. The postcard set front side 202 is intended to be on-demand printed with customer-specific mailing address 206 and selected promotional travel offerings incorporating value-adding elements. The reverse side 204 of postcard set 200 is entirely preprinted with fixed information: The postcard set reverse side 204 of the customer addressed post card is printed with pictorial information 208 about luxury cruise A and pictorial information 210 about luxury cruise B; the postcard set reverse side 204 of customer return post card is printed with Travel Card Company return address 212 and business reply postage 214. Post card set 200 is intended to be machine folded and sealed so that the customer address 206 and business postage franking 216 is visible on initial mailing.

The postcard set front side 202 of is on-demand printed with customer specific information and promotional offers, including certain value-adding elements from FIG. 18 that are placed in areas 218 and 220 depending on the promotional offer being made to the specific customer identified in customer address 206. The postcard set front side 202 of return postcard has luxury cruise A description 222 with associated information request area 224; also luxury cruise B description 226 with associated information request area 228. In addition, for Gold and Platinum Members, there are special on-demand printed promotional areas that are not printed unless special offers are being made; this includes promotional area 230 with customer-markable response areas 232 and 234, associated information request area 236, and a reserved area 238.

In FIG. 18, four value-adding elements 240 through 246 are shown. Repositionable 2-class cruise upgrade coupon 240 intended to be offered to Green Members only; repositionable 3-class cruise upgrade coupon 242 is intended to be offered only to Gold and Platinum Members; the appropriate coupon is to be placed on customer address postcard in cruise upgrade offer area 218. Permanently attached RFID transponder label 244 is to be placed in Platinum Member promotional reserved area 238 on postcard set reverse side 204 (see FIG. 17B) of all mailings to Platinum Members. It carries in the transponder memory the Platinum Member-specific address, travel history and card usage information 248. It is preprinted with an offer of free global Internet E-mail service by an Internet Service Provider associated with Travel Card Company which also advertises on-line only luxury merchandise. When a Platinum Member accepts the free E-mail offer, the return postcard is given to the Internet Service Provider and the information stored in the memory of the RFID transponder label 244 is read wirelessly and used to automatically set up the Platinum Member's global E-mail account. In case of transponder failure, the key customer information, namely name and card number, are also on-demand printed in customer name and card number field 250.

Repositionable free flight coupon 246 contains an offer from Urban Legends Helicopter Service for a free helicopter flight form the main airport to a downtown heliport in New York City, Chicago, Paris or Tokyo. It is intended to be offered only to those Gold and Platinum Members which also stay more than a total of fifteen nights each year in the luxury downtown hotels in any or all of those four cities. When appropriate for use with a given card member, it is placed in special offer area 220 on customer address postcard.

In accordance with certain aspects of the production process to be described in detail below, an on-demand printed postcard set is produced for each Green, Gold or Platinum Member with selected value-adding elements from FIG. 18 to be placed as described above depending on the member's card color and travel history. When received by each member, if so interested, the member takes specific actions with respect to the repositioning any value-added coupons present and marking the customer response areas 232 and 234 (if present) to accept or reject the associated promotional offers. The interested member then mails the postage-paid return card to Travel Services Company to implement the requested promotional offers.

Returning to FIG. 17, if the member is interested in receiving the information about luxury cruise A, then the offered value-adding coupon (either 240 or 242) in cruise upgrade offer area 218 is removed and placed in information request area 224. Similarly, information about luxury cruise B may be requested by removing said repositionable cruise upgrade coupon from offer area 218 and placing it in information request area 228. Should a Platinum Member decide to accepted the free global E-mail service offered by the preprint on RFID transponder label 244, he checks the "Yes" box in custom-printed response area 232 (printed only when RFID transponder label 244 is also attached in reserved are 238). Should the selected Gold and Platinum Members receiving the special free flight offer coupon 248 from Urban Legend Helicopters decide to accept it, said member removes the coupon from special area 220 and places it in special area 238, and checks the box in custom printed area 236 for the city in which the member would like the free flight.

FIG. 19 is a top schematic view of one example of a three-stage production process embodying exemplary aspects of the invention in three different forms that may be used to prepare the finished postcard sets. A supply of postcard stock 300 which is preprinted on the reverse side of each postcard set 200 with fields 208, 210, 212, 214 and 214 (see FIG. 17), and possibly preprinted only on the front side with business postage franking 216 (all though forms of this may also be on-demand printed). Postcard stock 300 passes through postcard printer 302, which contains a variation of the second invention embodiment 168 using externally preprogrammed transponder labels. This postcard printer 302 is driven through connection 304 to factory controller 306, which in turn is connected through local area network 308 to main computer 310 which includes processing program 312 and card member database 314. Certain file information from each entry in card member database 314 is selected by processing program 312 and is transferred over local area network 308 to factory controller 306 for use by factory control program 316 to direct the production operations in the preparation of each corresponding postcard set 200.

Typically, the member files in card member data base 314 are in sequential order with respect to card number, but random by membership color as this may change during the life of a card member account. For each Platinum Member file encountered, transponder label printer 318, which contains the first invention embodiment described above, is directed by factory controller 306 over connection 320 to prepare an RFID transponder label 244. Using diecut label supply 322 and self-adhesive RFID transponder supply 324, the transponder label printer 318 produces a sequential transponder label strip 326 of programmed RFID transponder labels 244, each of which has been preprinted with the Platinum Member's name and card number, and embeds an RFID transponder encoded with relevant card member information from database 314. This sequential transponder label strip 326 of RFID transponder labels 244 is used as the RFID transponder label supply for postcard printer 302

The Stage 1 production operation is performed by postcard printer 302, and includes all the on-demand printing operations. As postcard printer 302 is directed to initiate preparation of a postcard set 200 for each card member, the required card member information is transferred to it over connection 304. If information for a Green or Gold Member is found, then just the appropriate on-demand printed customer mailing address 206 on the front side of card, and luxury A and B cruise information 222 and 226, respectively, are printed on the postcard set front side 202 of return mail card (see FIG. 17). If a Gold or Platinum Member is found to qualify for the free flight coupon, then offer customer-markable response area 232 is also printed. For all Platinum Members fields 206, 222, and 226 are printed the same as for a Gold Member, and the customer-markable response area 234 to special lifetime E-mail offer is also printed. It is first verified that the corresponding RFID transponder label 244 is in position for placement; then said RFID transponder label 244 is placed in reserved field 238. A schematic example of first Green Member postcard set 328 and first Platinum Member postcard set 330 as outputs of Stage 1 production are shown in FIG. 19.

In Stage 2 of the production process, additional value-adding processes incorporating the invention are used to complete the custom configuration of the postcard set media by the addition of one or more of selected value-added elements shown in FIG. 18. First additional value-adding process 332 selectively adds 2-class cruise upgrade coupon 240 from first coupon supply 334 to postcard set 200 when so directed by production controller 306 over connection 336. Second additional value-adding process 338 selectively adds 3-class cruise upgrade coupon 242 from second coupon supply 340 to postcard set 200 when so directed by production controller 306 over connection 342. Third additional value-adding process 344 selectively adds free flight coupon 246 from third coupon supply 346 to postcard set 200 when so directed by production controller 306 over connection 348.

Exemplary output from the Stage 2 are shown as custom configured postcard media 350, 352, 354 and 356. Second Platinum Member postcard set 350 was custom configured with free flight coupon 246 using third additional value-adding process 344; 3-class cruise upgrade coupon 242 added by second additional value-adding process 338; and RFID transponder label 244 as configured by the first invention embodiment in transponder label printer 320 and placed by second invention embodiment in postcard printer 302. First Gold Member postcard set 352 was custom configured with only 3-class cruise upgrade coupon 242 added in second additional value-adding process 338. Second Green Member postcard set 354 was configured for a Green Member receiving only 3-class cruise upgrade coupon 240 added in first additional value-adding process 332. Second Gold member postcard set 356 is custom configured with cruise upgrade coupon 242 from second additional value-added process 338 and free flight coupon 246 from third additional value-adding process 344.

In Stage 3 of the production process of FIG. 19, sheeter-folder-sealer process 358 is used to prepare the custom configured postcard media for mailing, under control of production controller 306 using connection 360. The continuous postcard media is cut part into individual postcard sets 200, folded and sealed to expose the front of the customer address postcard set front side 202. An example of Stage 3 output, namely a finished postcard set 362 is shown being ejected from sheeter-folder-sealer 358 on to the stack of completed custom-configured postcard media 364.

A number of alternatives of the FIGS. 17–19 method and system are contemplated by the present invention. For example, in one variant coupons 240, 242, and/or 246 also have RFID transponders. The transponders in these value-adding elements may be programmed with the same data as described above with respect to transponder 244. What is unique in this variant is that the element which is peeled off and transferred to another part of the media (which could also be to another separate media) is or has embodied therein a memory containing useful information which can be accessed wirelessly by the organizer of the promotion or another involved party.

Alternatively, rather than an RFID transponder of the type having a memory, a chipless RFID transponder may be substituted. For example, rather than a transponder such as shown at 244, in space 238 on card set 200 a resonant series of conductive lines may be printed on the card. Or a variety of other chipless RFID technologies may be employed. Integrated circuit labels, of a type similar to those shown in FIG. 16, may also be used with printed antennae to form RFID transponders in situ.

In accordance with exemplary aspects of the present invention, as described in FIGS. 17–19, on demand a mailer is being sent which has the following attributes:

1) various personalized on demand printings on the media directed to appeal to known interests of the target prospect;
2) various targeted coupons or other value-adding elements placed on demand on the media;
3) RFID transponders containing target specific data which will be used in after processing the card when returned;
4) on demand printing on the transponders which is tied to the target and the stored information;
5) plural value-adding elements which not only relate to the target prospect, but to each other as well, to form a coordinated, prospect-specific appeal;
6) an action response item (the transferred coupons) prompting the prospect to take action which is not just a generic "YES I WANT TO BUY" token, but a response item which is personalized for the particular prospect.

In short, the card may have as many as half dozen or more on demand printings or value-adding elements which are coordinated to develop a powerful personalized and integrated sales appeal.

In yet another execution of certain exemplary aspects of the principles of the invention, a transponder 52 may be programmed with instructions which control subsequent processes such as the application of another value-adding element on the same media. For example, in a variant of the FIGS. 17–19 embodiment wherein the value-adding processes 332, 338 and/or 344 are distributed and not under the control of controller 306, RFID transponder label 244 could be programmed with instructions which would be read as part of the value-adding processes to determine the type, content, or other characteristic of a value-adding element to be added to the media containing the transponder label 244. Alternatively, for example, address data stored in the label 244 could be read at a postage metering station to determine the correct postage.

Thus, the embodiment of FIGS. 17–19 illustrates certain exemplary features of the present invention as a method of configuring on demand a series of labels, tickets, tags, plastic cards, postcards or other media by selectively applying, inserting, or otherwise associating with certain media—but not with other media—in the series one or more discrete, value-adding elements. And, preferably, in a coordinated integration therewith, the application of one or more printings on the media and/or the value-adding elements to provide further flexibility in the presentation of information to end users and other.

Figure 20:
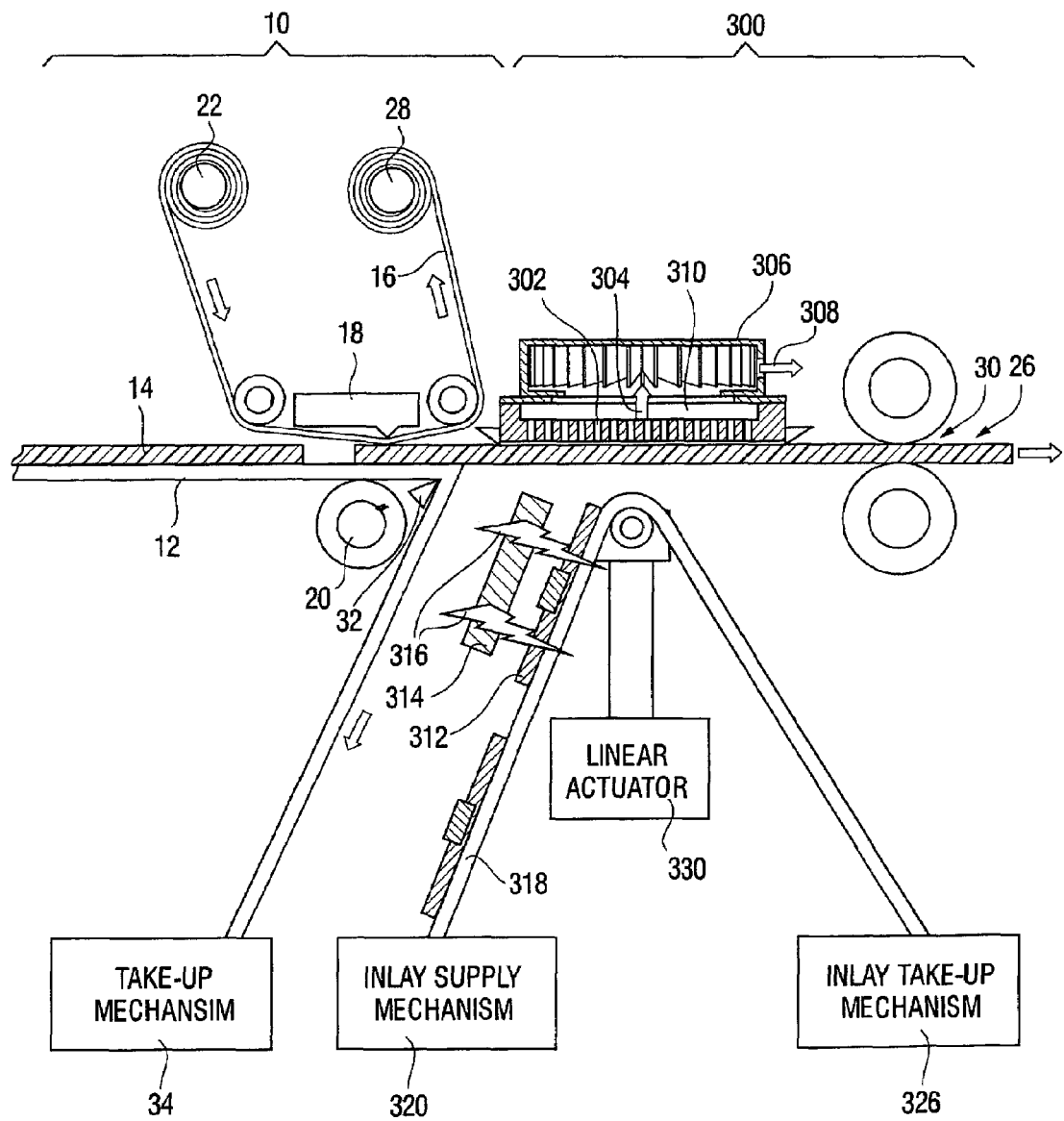
FIGS. 20–23 are side, schematic views of a thermal transfer printer mechanism that incorporates a number of aspects of the present invention disclosed in this application, and that an RFID transponder to be selectively and on demand, under program control, RFID transponder encoded, and attached to an adhesive backed previously printed diecut label.

Referring to FIG. 20, an "in-line" embodiment of a transponder applicator mechanism 300 is illustrated that selectively and on demand, under program control, encodes, reads and/or validates an RFID transponder, and attaches the same to an adhesive backed previously printed diecut label 26. The transponder applicator mechanism 300 may be integrated with existing thermal transfer printing mechanism 10, or it may be attached to a thermal printer or other type of printer as an optional module, or may be configured as a stand-alone media converter.

In the embodiment of the invention illustrated in FIG. 20, the printed diecut label 26 is removed from its label carrier 12 by the action of peeler bar 32 and label carrier take-up mechanism 34. During its forward motion that is driven by platen roller 20, the printed surface of the printed diecut label 26 maintains a substantially straight path towards media exit 30 along a perforated vacuum guide plate 302. The light vacuum force 304, that is generated by a centrifugal blower 306 that expels air 308 from a closed plenum 310, controls the path of, but does not impede the motion of, diecut label 26.

When formation and encoding of a smart label is desired, then, prior to printing the diecut label 26, an RFID transponder 312 is in a position under RFID encoder 314. Encoder 314 encodes the RFID transponder 312, and verifies the same using radio signal 316 in the manner described in this application. In the illustrated embodiment, the transponders are adhesive backed, and are supplied diecut from an inlay carrier 318 by inlay supply mechanism 320.

Figure 21:
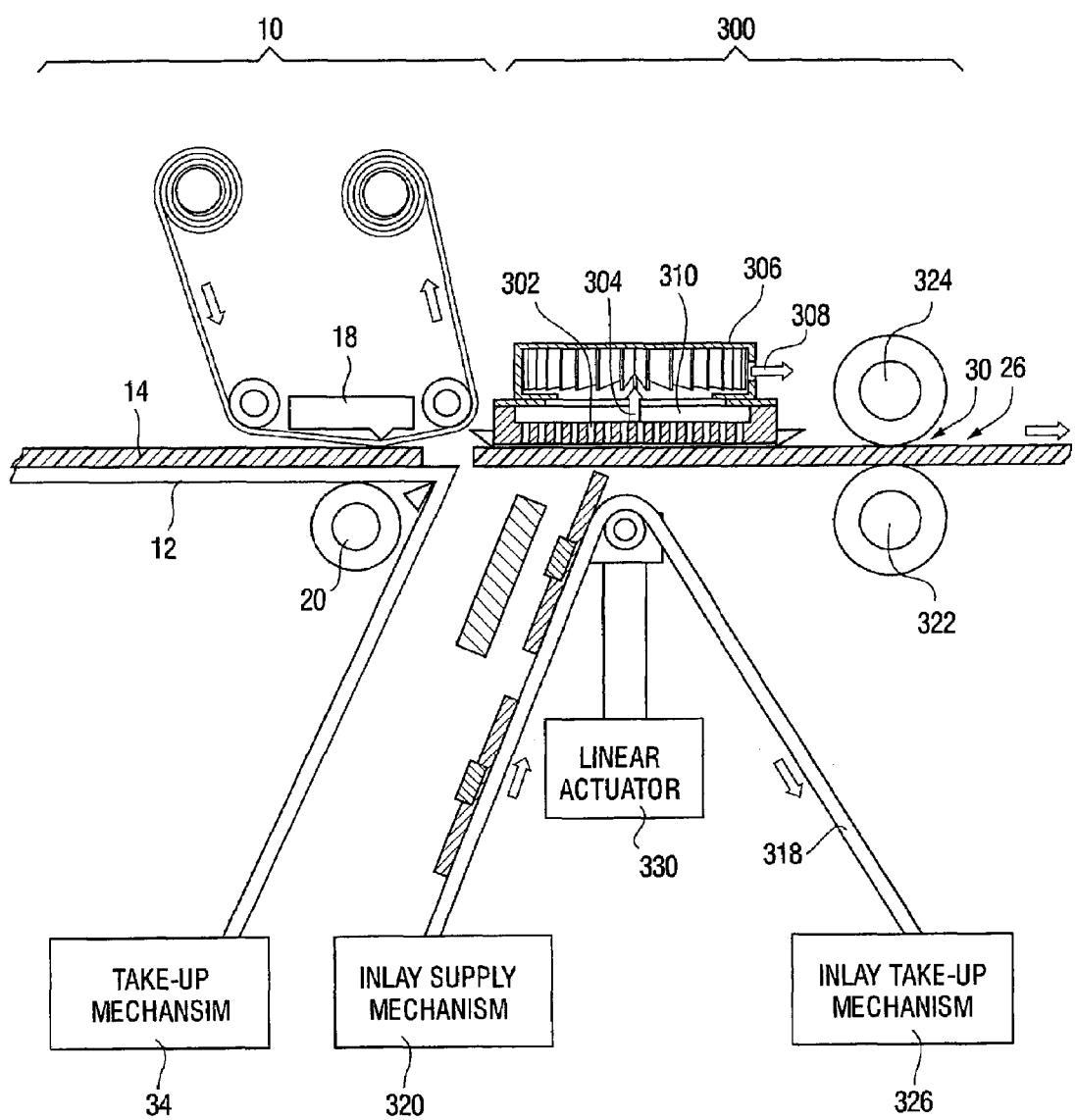

Referring to FIG. 21, when the leading edge of the next diecut label 14 is in position under the printhead 18, the motion of the platen roller 20 and label carrier take-up mechanism 34 stops. Also, forward motion of the printed diecut label 26 continues now to be driven by the siliconized drive roller 322, which is typically operationally coupled to the drive of platen roller 20, but runs at a slightly faster surface speed. It presses lightly against the adhesive side of printed diecut label 26 and against spring loaded nip roller 324.

Assuming that correct encoding and verification has taken place, when the printed diecut label 26 is at the correct position in its forward travel, the encoded RFID transponder 312 is now moved forward by the action of inlay carrier take-up mechanism 326 on inlay carrier 318. As the transponder 312 reaches the top of its path over roller 328, the linear actuator 330 now advances small roller 328, which presses the leading edge of encoded transponder 312 against the adhesive side of printed diecut 26.

Figure 22:
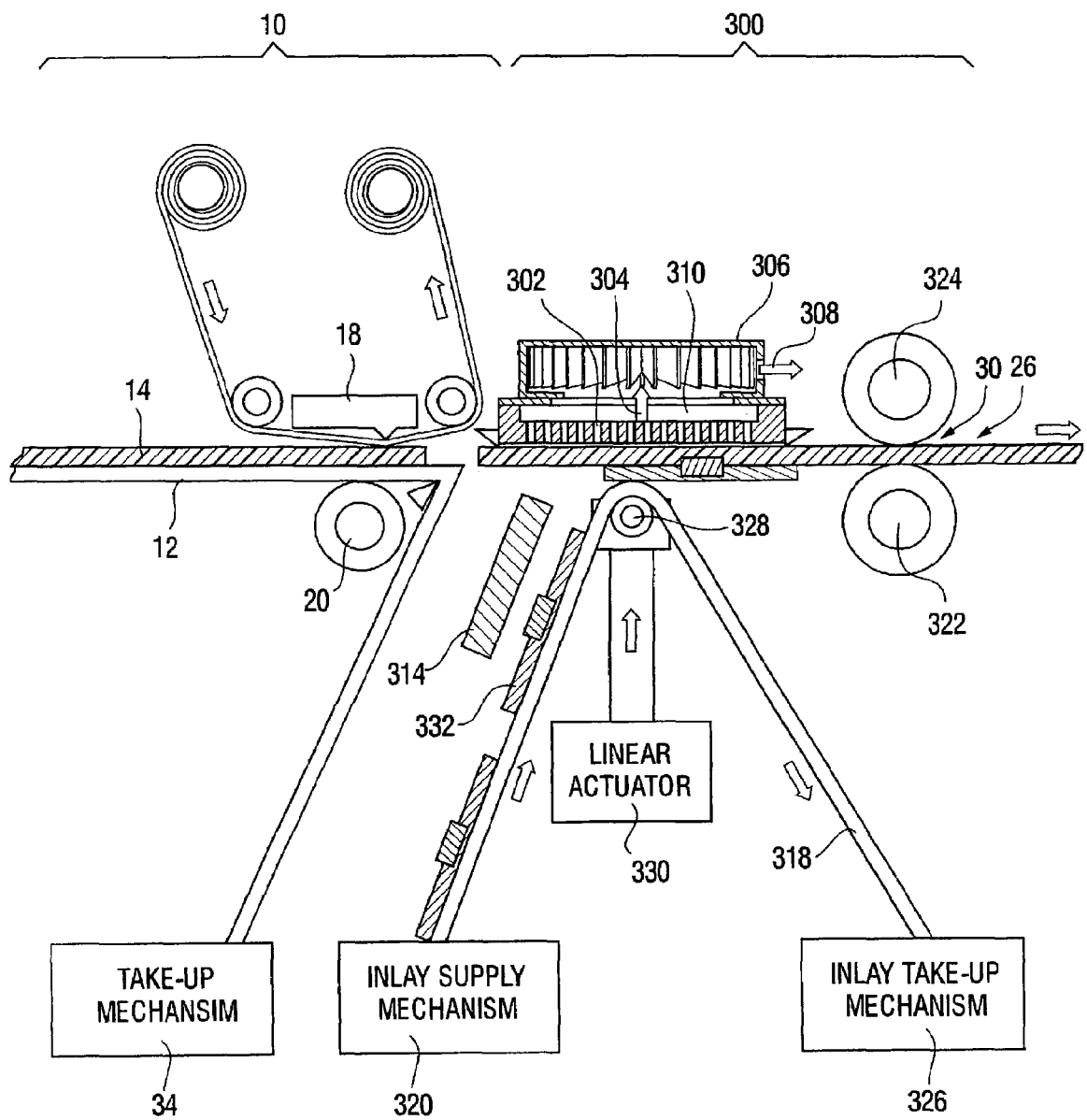

Both the inlay carrier 318 and the printed diecut label 26 are now driven forward at the same surface speed, so that the encoded RFID transponder 312 is peeled from the inlay carrier 318 as it passes over the small roller 328, as shown in FIG. 22. Once the encoded RFID transponder 312 is completely peeled from the inlay carrier 318, then the linear actuator 330 retracts, and the next unencoded transponder 332 in now in position under encoder 314 for use in the next smart label dispensing cycle.

Figure 23:
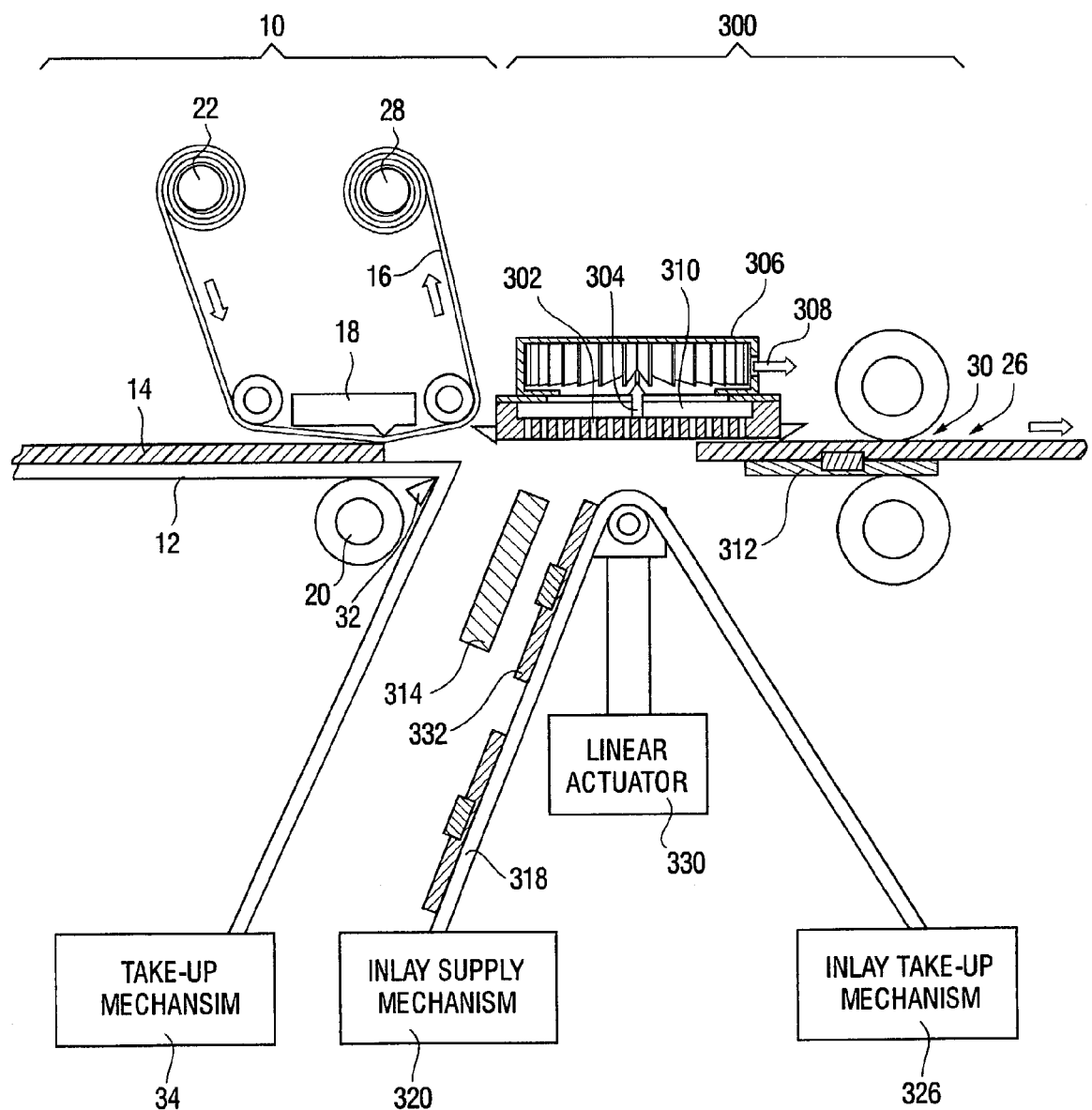

Referring to FIG. 23, forward motion continues until the peeled printed diecut label and encoded RFID transponder sandwich (26/312) in delivered at media exit 30. The pressure of the nip formed by siliconized drive roller 322 acting on the sandwich against spring loaded nip roller 324 permanently bonds the peeled printed diecut label—encoded RFID transponder sandwich (26/312).

Transponders which fail to verify may be either (1) attached to "void" printed labels as described above, (2) recaptured while still on the inlay carrier 318 by the inlay carrier take-up mechanism 326, or (3) dispensed internally into a waste bin. The latter 2 methods avoid wasting a label to eliminate a bad transponder.

Figure 24:
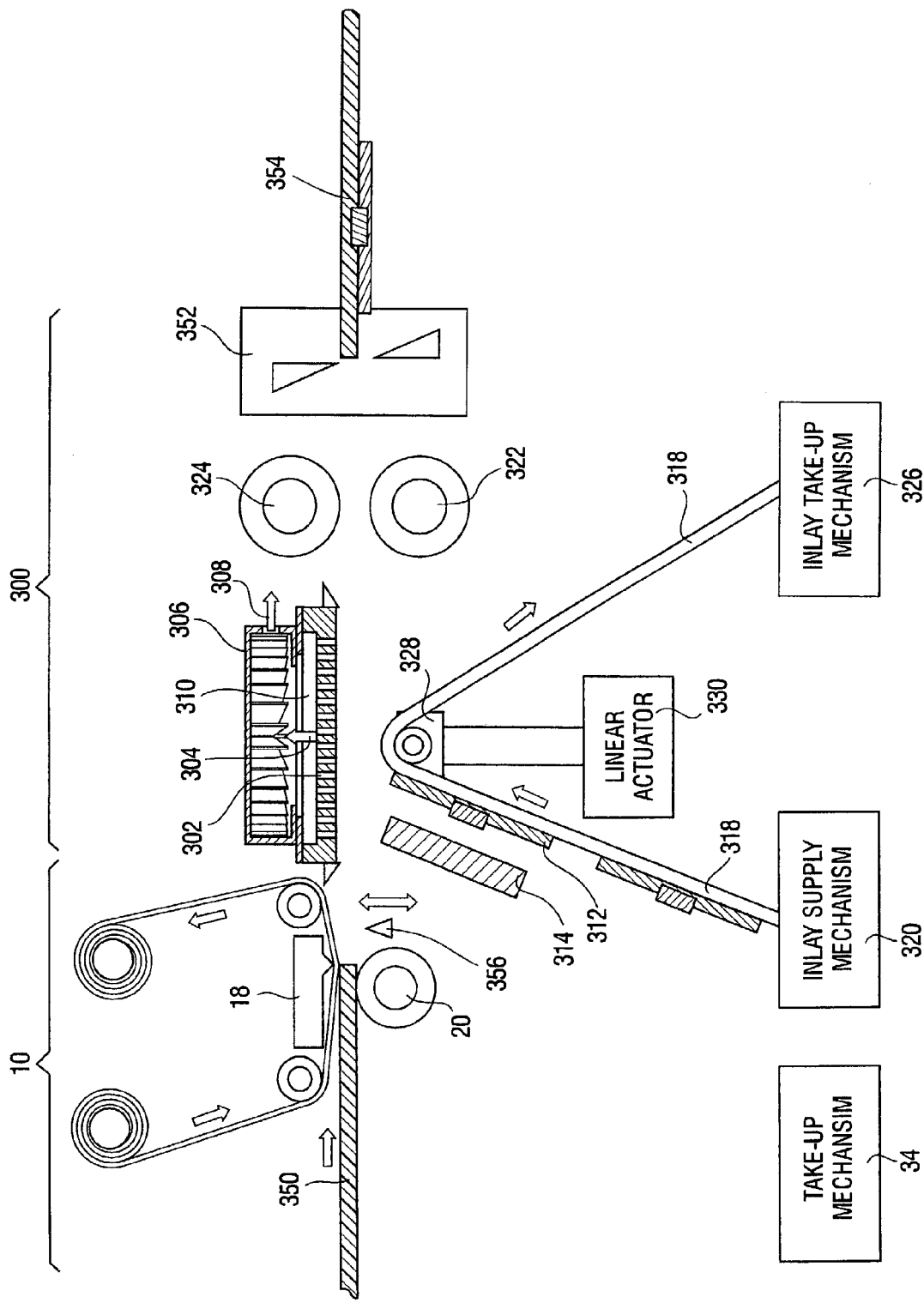
FIG. 24 is a side, schematic view of a thermal transfer printer mechanism, similar to FIGS. 20–23, that allows an RFID transponder to be selectively and on demand, under program control, RFID transponder encoded, and attached to a linerless media.

A still further embodiment for continuous linerless media using active adhesives (i.e., where there is no diecut label carrier 12) is shown in FIG. 24. Here, platen roller 20 and drive roller 322 are both siliconized to prevent adherence of the label and transponder adhesive to these rollers. The continuous linerless label stock 350 is printed and an encode RFID transponder 312 attached in a manner similar to the above embodiment. However, once a completed label is dispensed to media exit 30, as shown, then an optional electrically activated cutter assembly 352 is used to shear the finished linerless label 354 with or without attached encoded RFID transponder 312. The continuous linerless label stock 350 is then retracted to its initial printing position under printhead 18.

When an inactivated adhesive is used, such as an Appleton Actifuse (trademark) liner material, then an optional retractable activating mechanism 356 may be used to activate the adhesive along the length of the finished linerless label 354 retracted for the length of the excess media, which must be dispensed to bring the finished linerless label 354 to the cut off point. Otherwise, the embodiment functions as with standard linerless material as described above.

FIGS. 25–29 illustrate schematically a number of versions of another printer embodiment with an "in-line" converting system for on demand application of selected transponders or other value-adding elements to predetermined individual media samples.

The FIGS. 25–29 embodiments, and the FIGS. 2–24 embodiments described earlier, illustrate that the present invention finds utility in a printer, printer module, stand-alone media converter, or other media processors. In each embodiment an on demand converting system has an applicator receiving a series of media samples and a series of value-adding elements. The applicator responds to a set of instructions which direct the applicator, sample by sample, to selectively apply or not apply a value-adding element to each media sample in the series of media samples.

An element conveyance is adapted to convey value-adding elements to the applicator where a selected value-adding element is applied to a selected media sample. In the illustrated examples depicted herein, the applicator receives media samples which have been separated from a liner and includes a vacuum conveyor arranged to convey media samples in the same direction as the element conveyance moves the value-adding elements to the applicator, or orthogonal thereto.

Figure 25:
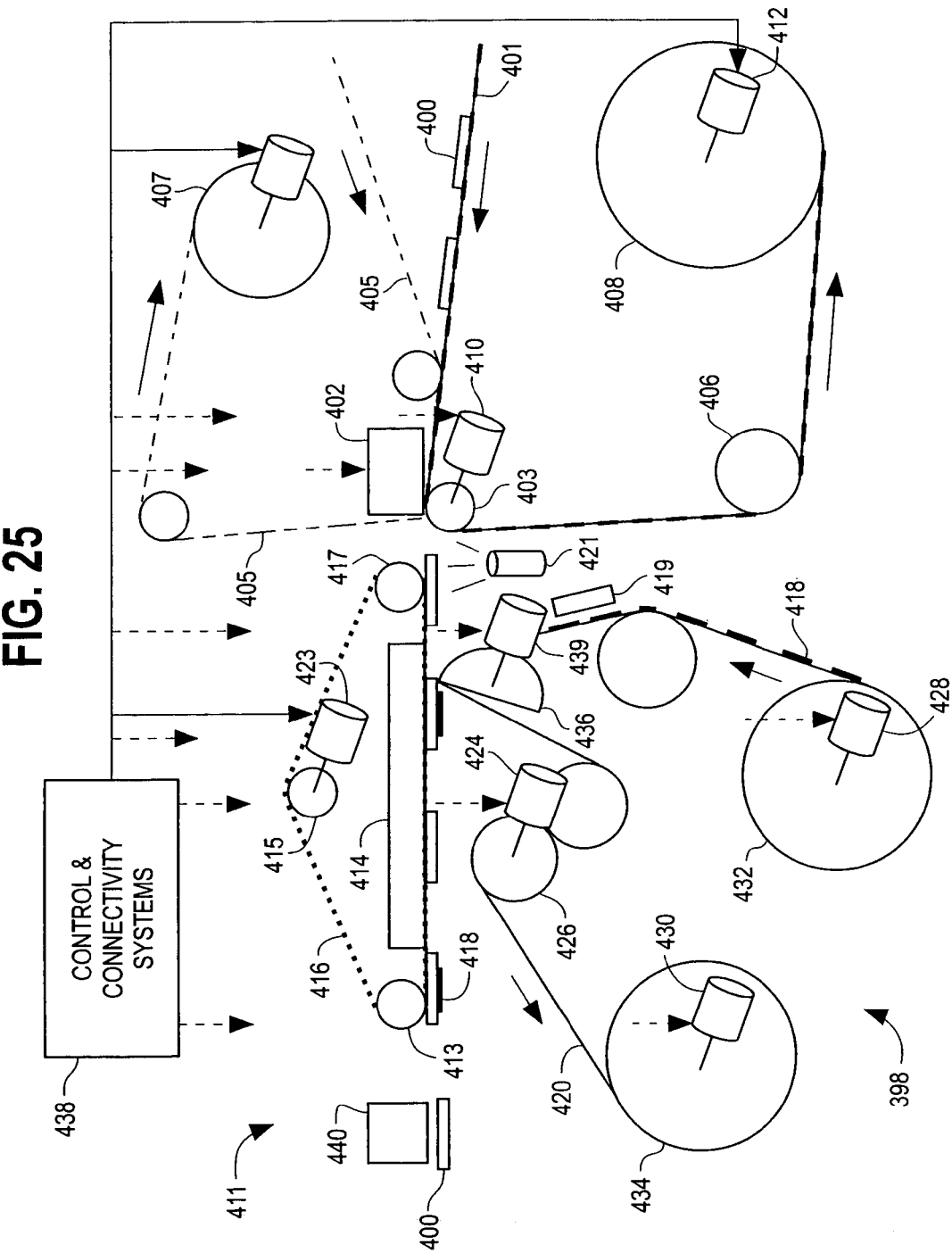
FIGS. 25–29 are schematic illustrations of additional embodiments of the principles of the invention.

Specifically, the FIG. 25 illustrates a system in which media samples 400 on a liner 401 are moved to a print station occupied by a print device 402 by a conveyance system including platen roller 403, guide roller 406 and a take-up spool 408. The platen roller 403 is driven by motor 410. A motor 412 maintains tension on the liner 401 by applying torque to take-up spool 408. As shown, the illustrated print device 402 may be of the thermal transfer type, requiring a thermal transfer ribbon 405 that is collected after use on a ribbon take-up spool 407, as is conventional. Alternatively, the media samples 400 may use a thermally-sensitive (thermochromic) printing surface for direct thermal printing without requiring a thermal transfer ribbon 405 and its attendant mechanism.

A peeler (not shown) separates the media samples 400 from the liner 401 where they are captured by a vacuum conveyor 411. The illustrated vacuum conveyor 411 comprises a vacuum chamber 414 across which is moved a perforated endless belt 416. The belt 416 is driven around rollers 413, 415, 417 by a motor 423. If necessary to aid the media samples 400 in bridging to the vacuum chamber 414, an air jet 421 or other assist method may be provided.

In accordance with an aspect of the present invention, the media samples 400 may be converted in applicator 398 which performs a selective, on-demand application of an RFID transponder or other value-adding element to predetermined media samples 400. In the illustrated embodiment a series of value-adding elements 418 on a liner 420 stored on a reel 432 are conveyed bidirectionally by a motor 424 coupled to a drive roller 426. Torque motors 428 and 430 on supply spool 432 and take-up spool 434, respectively, and maintain tension on the liner 420.

In accordance with an aspect of the invention, the value-adding elements 418 are peeled from supporting liner 420 by a novel bi-functional peeler 436 (described below). A control and connectivity system 438, which may comprise a programmed or programmable computer or microprocessor system, controls the converting operation.

The control and connectivity system 438 may be viewed as a variant or expansion of the FIG. 6 system described above for managing the selective on demand control of the printing operation (if the media processor includes a print device) and the selective on demand application of one or more like or different value-adding element(s) to a selected one of a number of media sample types. The components of the control and connectivity system 438 are conventional.

Referring to the FIG. 6 system, the processor unit 138 may be coupled through a communication interface to a local area network, such as an Ethernet network, intranet, or other suitable network. The communication interface may be connected to the Internet though any of a variety of wired or wireless links. A suitable control and connectivity system is the ZebraLink™ system provided commercially by Zebra Technologies Corporation, the assignee of the present application.

The ZebraLink™ system provides to a user selective on demand control of a printer (adaptable for other media processors) from anywhere in the world through the Internet. For example printer settings can be configured and tasks can be developed and sent to any selected media processor connected to the Internet. One or more processors can be monitored and auto alerts sent if an error or problem is detected. Input-output communication is provided through a variety of input-output devices and peripherals.

The ZebraLink™ system has a WebView™ feature that facilitates management of printers (and other media processors through adaptation) by providing real-time graphical configuration, control, and monitoring capabilities through a standard Web browser interface such as Microsoft Internet Explorer™. The system provides complete control and management of printers and other devices across the enterprise, uses a standard graphical interface system, and operates under any TCP/IP Ethernet network system, such as a corporate LAN or the Internet.

Reverting to FIG. 25, in operation, if the controlling program instruction set calls for a standard (non-smart) media sample 400 to be generated with a bar code, graphics and/or human-readable text, the platen roller 403 is driven by motor 410 under the control of control and connectivity system 438 until the next or a predetermined media sample 400 is driven under the print device 402 where the appropriate bar code, text and/or graphics are applied.

The now-printed media sample 400 is peeled, as described, and passed to the vacuum conveyor 411 where it is carried to the applicator 398. If the controlling program instruction set calls for application of a transponder or other value-adding element 418, controller 438 sends motor command signals which cause the liner 420 to move a predetermined distance across peeler 436 effective to peel the next value-adding element 418 from its supporting liner 420 and apply it to the exposed adhesive surface on media sample 400 to be converted. If the value-adding element is an RFID transponder, it is first interrogated by a reader 419 to verify that it is not defective and/or takes action to ensure that it is accurately encoded with appropriate data.

If the printed media sample 400 is to remain "dumb", the applicator 398 is caused to be quiescent, and the printed media sample is conveyed by vacuum conveyor 411 to an exit station. As shown in FIG. 25, a number of the media samples 400 have been converted, carrying value-adding elements 418, and others have not. Thus, in accordance with an aspect of the present invention, the user has complete flexibility in storing information on a media sample 400 in the form of printed codes (such conventional bar codes), or human-recognizable text or graphics, or in a wireless storage medium such as an RFID transponder capable of storing large amounts of remotely accessible data. Importantly, the printing is accomplished responsive to control instructions before the value-adding elements is applied to prevent damage to the element if, for example, the value-adding element is an RFID transponder.

A second print device, shown schematically at 440, may be employed to print on the media-sample-element sandwich after its assembly by applicator 438. This may be in addition to or as an alternative to first printing device 402.

The FIG. 25 embodiment thus illustrates an on demand printer with converting capability, having a print device receiving a series of labels, tickets, tags, cards or other media samples. The print device responds to a set of form and content print instructions which direct the print device regarding what and where to print on selected media samples. A converting system having an applicator receives the series of media samples from the print device and a series of value-adding elements. The applicator responds to a set of application instructions which direct the applicator to apply a value-adding element such as an RFID transponder to selected media samples.

Figure 26:
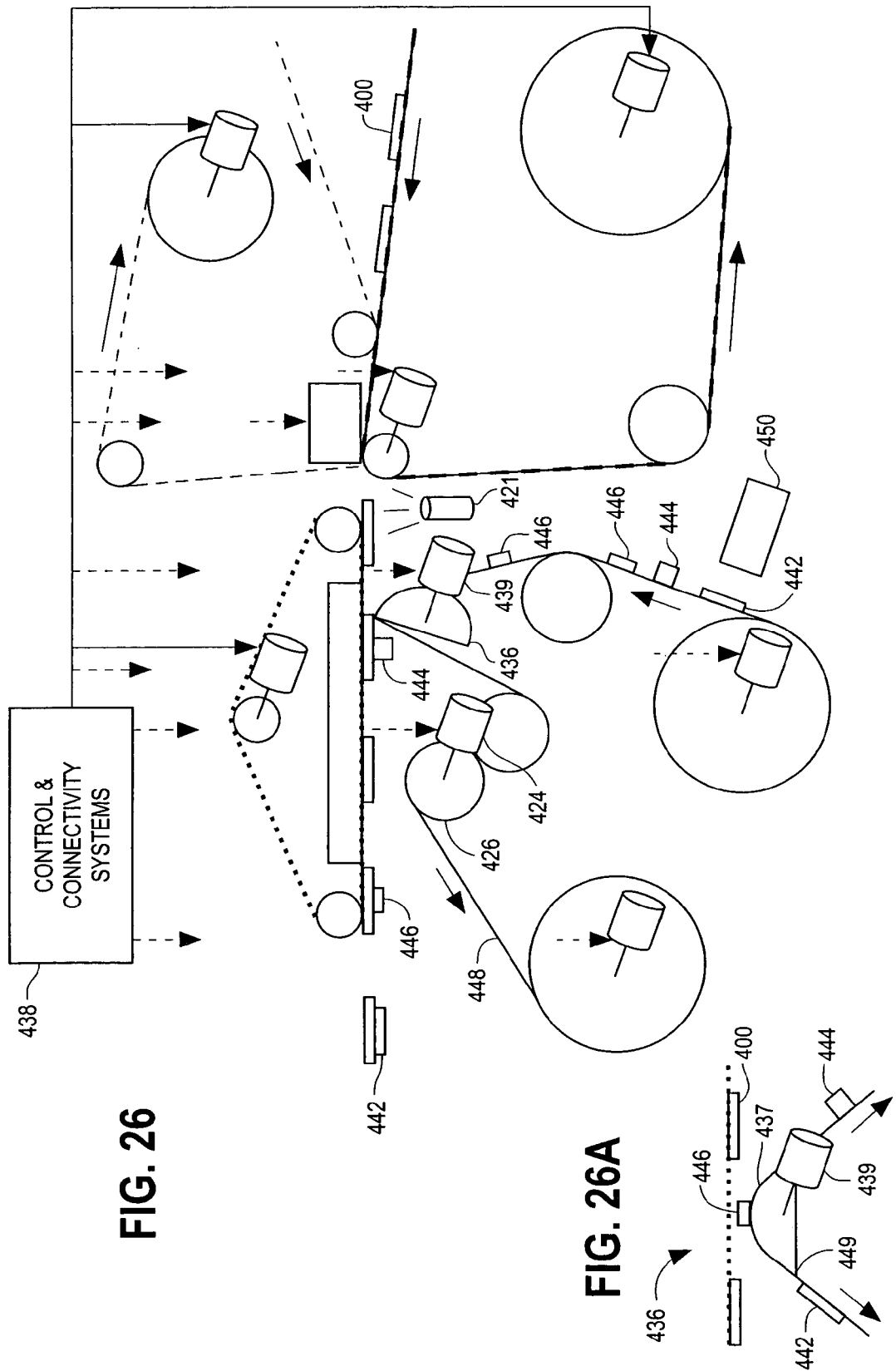

FIG. 26 illustrates in highly schematic form an embodiment of an aspect of the invention which is essentially the same as the FIG. 25 embodiment with one difference. In the FIG. 26 system a plurality of different value-adding elements 442, 444, 446 are available on liner 448 and can be selectively applied to a predetermined media sample 400 as dictated by commands developed in control and connectivity system 438. The motor 424 driving drive roller 426 is bidirectional, permitting the liner 448 to be precisely moved under computer program control a predetermined distance to a position wherein the value-adding element called for is peeled and applied to a predetermined media sample which has been moved into position adjacent the peeler 436. This aspect of the invention may be favorably implemented in situations where it is known in advance the order in which the value-adding elements 442, 444, 446 will be called for.

If it is desired to apply a value-adding element to a media sample which is not "next in line", in accordance with an aspect of this invention the peeler 436 receives a command from the control and connectivity system 438 to rotate to a position such as shown in FIG. 26A wherein peeler 436 presents a rounded surface 437 and the peel edge 448 is not operative to peel the value-adding elements off the liner 448. The peeler 436 is thus transformable on demand from a device which is capable of separating value-adding elements from a supporting liner to a device which is incapable of performing such function.

In the position shown in FIG. 26A, value-adding elements 442, 444, 446 can be driven past the peeler 436 and then brought back across the peeler, depending upon the commands issued from the control and connectivity system 438. The control and connectivity system 438 is responsive to a sensing system 450 which is capable of identifying the type of value-adding element registered with the system 450. The control and connectivity system 438 is capable of storing in memory the location of each value-adding element on the liner 448, and is thus able to move a value-adding element of the type called for to the peeler 436 from either side of the peeler. Further sensors may be employed to detect when a value-adding element of a particular type is in an exact position to be applied to a predetermined media sample 400. As noted above, in applications where a sequence of different value-adding elements is to be used in repeating identical groups, the web of value-adding elements can be prepared to have the desired repeating sequence of value-adding elements.

The teachings of the FIG. 26 embodiment may be employed in a system, for example, wherein the value-adding elements are transponders of different types—for example, transponders having different storage capacity, sensitivity, communication protocols, or operating frequency. A single media sample could have applied thereto multiple transponders—for example a transponder with an operating frequency at 13.56 MHz to meet a common standard used in Japan, and a second transponder with an operating frequency at 869.4 MHz to meet a standard employed in Europe. If such a media sample (a shipping label, for example) were applied to cartons to be shipped to Europe and Japan, the same label could be used for both destinations.

The novel peeler arrangement has another use. See the FIG. 27 system which is like the FIG. 25 system except for the operational mode of the peeler 436. In many applications it is desirable to collect the value-adding elements which are not applied—for example, defective transponders for return to the vendor for credit or analysis. As noted, if the value-adding element is an RFID transponder, it's functionality or operativeness is verified by reader 419. With the present invention, if a defective transponder (or other value-adding element to be collected) is identified, the control and connectivity system 438 signals the motor 439 to rotate peeler 436 to an inoperative position, such as shown in FIG. 26A. The controller pauses the drive of the web of media samples 400 and vacuum conveyer 411 and moves the defective transponder (see 418), through appropriate signals to motor 424, past the peeler 436 for subsequent collection on take-up spool 440. When a fully functional, properly encoder transponder is now in position for application by peeler 436, motor 424 rotates it back to the operative peeling position and application of the transponder to the media sample continues as in the description of the FIG. 25 embodiment above.

The embodiments described provide above great latitude to a user in on demand printing on media samples, and in coupling one or more value-adding elements of various types to a media sample. An embodiment illustrated in FIGS. 27A and 27B has a feature which affords still greater flexibility to one using the present invention. The FIGS. 27A and 27B embodiment may be similar to the FIG. 25 embodiment, or other embodiments described above, except that it provides additional flexibility in choice of media sample. In FIG. 27A media samples 470 and 472 on liner 473 represent a plurality of media samples of different types or having different attributes. The different media samples may be labels of different size or type, for example. Or they may be different types of media samples—for example, one may be a label and another a ticket or tag or coupon. With this aspect of the invention a variety of diverse media samples may be mixed on the same supply web. By way of example only, a printer located at an airline check-in counter could be configured to supply, from one piece of equipment, a custom printed boarding pass or ticket, a custom printed baggage tag with a peel-off coupon or other sticker, and a smart baggage tag for use with laptop computers or other special baggage to be more comprehensively tracked.

Figure 27:
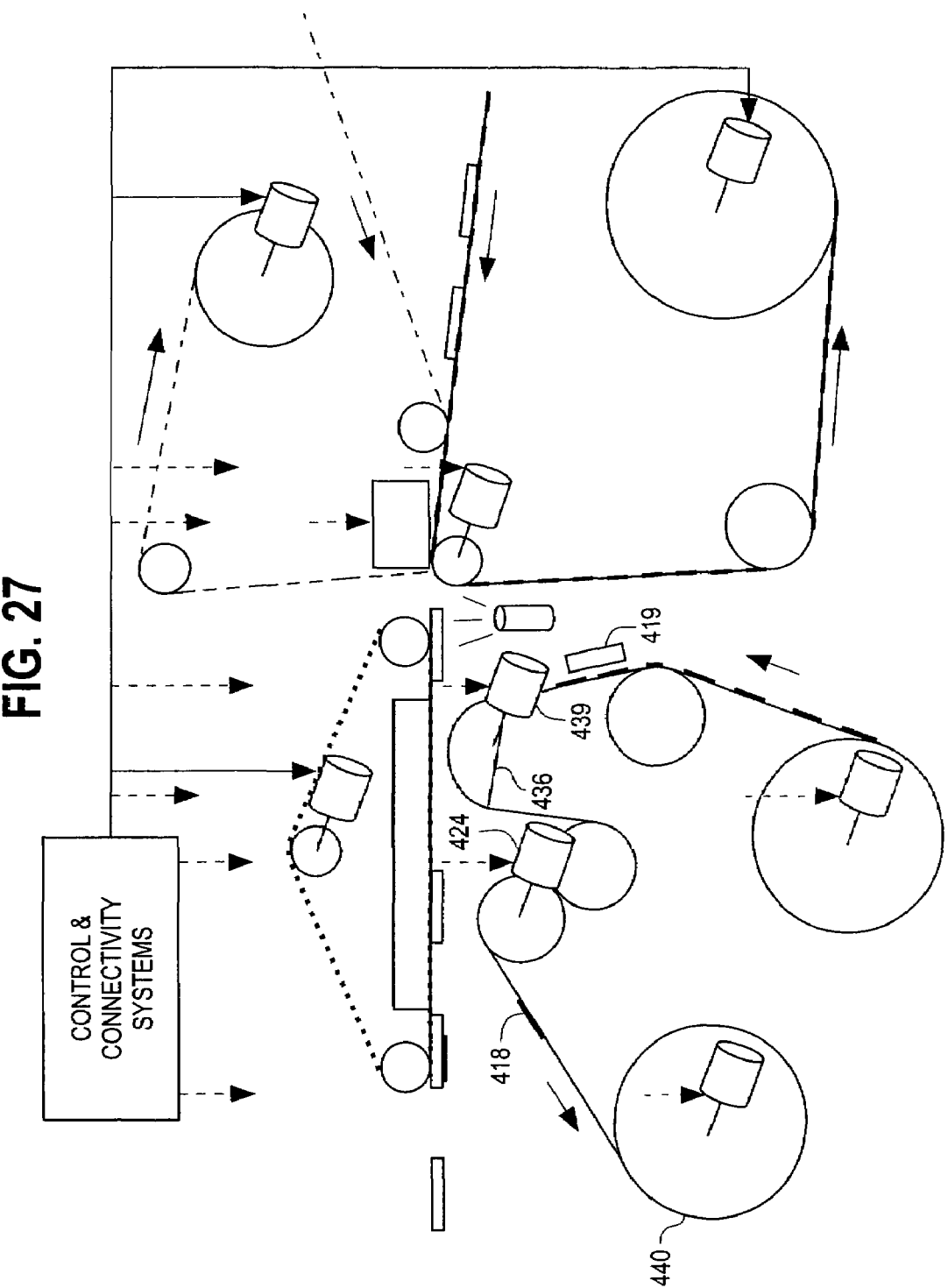
Figure 27A:
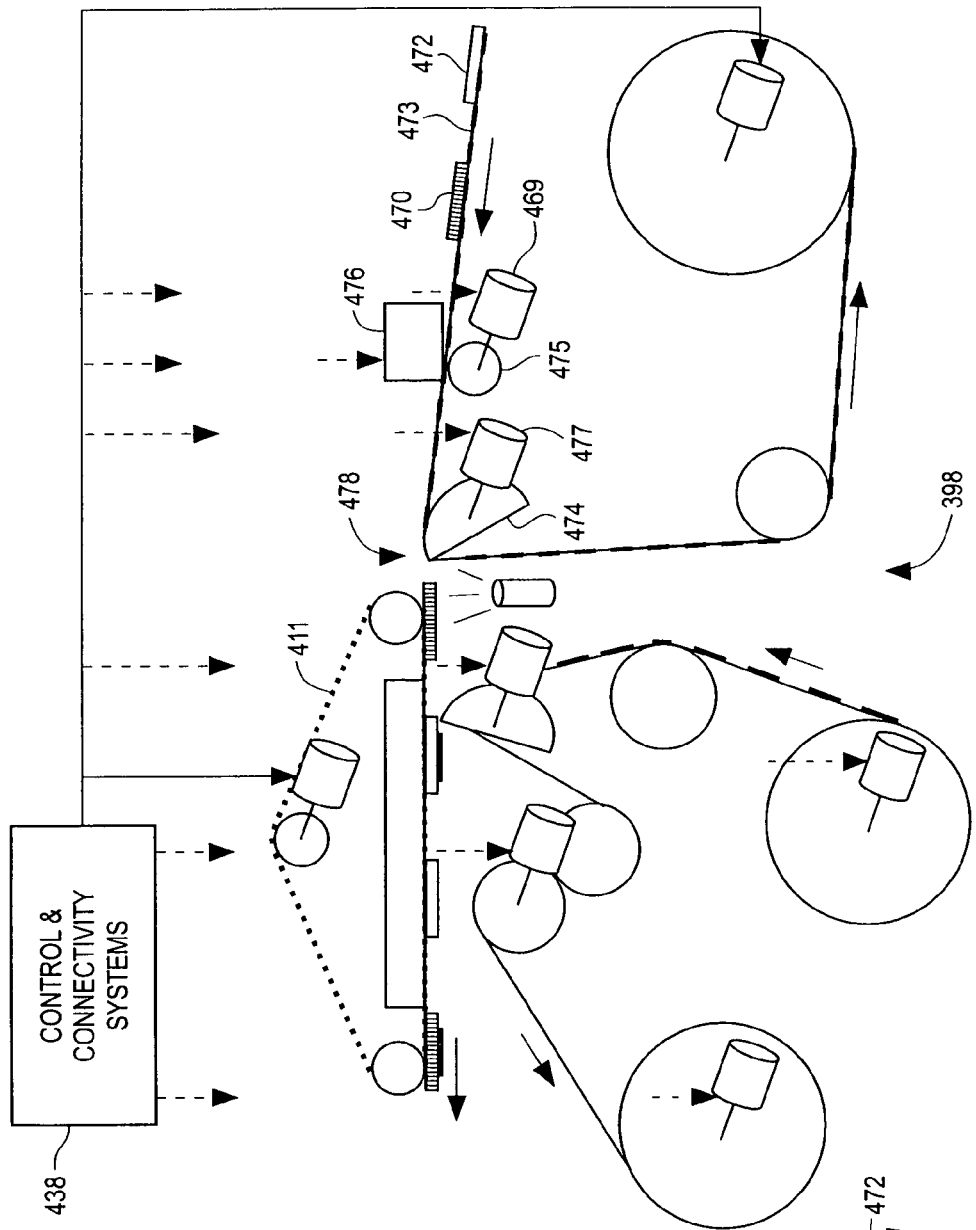
Figure 27B:
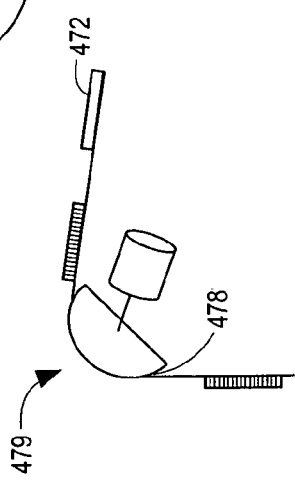

In the FIGS. 27A–27B system the plurality of different media samples can be selectively made available to applicator 398 as determined by commands developed in control and connectivity system 438 driving a drive roller 475 via motor 469. Drive roller 475 is here shown as a platen roller for a thermal printhead 476. A peeler 474, which may be similar to peeler 436 described above, may be rotated by a motor 477 under the control of control and connectivity system 438. The motor 469 driving drive roller 475 is bidirectional, permitting the liner 473 to be precisely moved under computer program control a predetermined distance to a position wherein the media sample 470 or 472 called for is peeled and delivered to vacuum conveyer 411.

If it is desired to supply a media sample to the vacuum conveyer 411 and applicator 398 which is not "next in line", in accordance with an aspect of this invention the peeler motor 477 receives a command from the control and connectivity system 438 to rotate the peeler 474 to a position such as shown in FIG. 27B wherein the peel edge 478 of the 474 peeler is inoperative and a rounded surface 479 is presented. The rounded surface 479 is not effective to peel media samples from the liner 473 and will pass media samples to the other side of the peeler, as shown. The peeler 474 is thus transformable on demand from a device which is capable of separating media samples from a supporting liner to a device which is incapable of performing such function.

In the position shown in FIG. 27B, media samples 470, 472 can be driven past the peeler 474 and then brought back across the peeler, depending upon the commands issued from the control and connectivity system 438. The control and connectivity system 438 is responsive to a sensing system 480 which is capable of identifying the type of media sample registered with the system 480. The control and connectivity system 438 is capable of storing in memory the location of each media sample on the liner 473, and is thus able to move a media sample of the type called for to the peeler 474 from either side of the peeler. As noted above, in applications where a sequence of different media samples is to be used in repeating identical groups, the web of media samples can be prepared to have the desired repeating sequence of media samples.

The FIGS. 27A–27B system may be usefully employed, for example, by an organization such as Ticketmaster™ to generate a series of media samples of different types—specifically different ticket components: 1) a header having general information; and 2) a number of individual tickets to separate events related in a series. The header could be "dumb", but the individual pass tickets could have RFID transponders which would admit the holder to a particular show and perhaps even through a particular entrance or gate. Thus with a single media processor, the user could produce tickets with different print content and form, using different media samples and containing differently encoded value-adding elements (transponders in this case) on certain samples and not on others.

Another of the countless applications for a system such as illustrated in FIGS. 27A and 27B is on a loading dock where one media processing system according to the present invention could be used to create standard bar code labels for application to individual cartons being assembled, and a smart label for application to an entire pallet of cartons.

Figure 28:
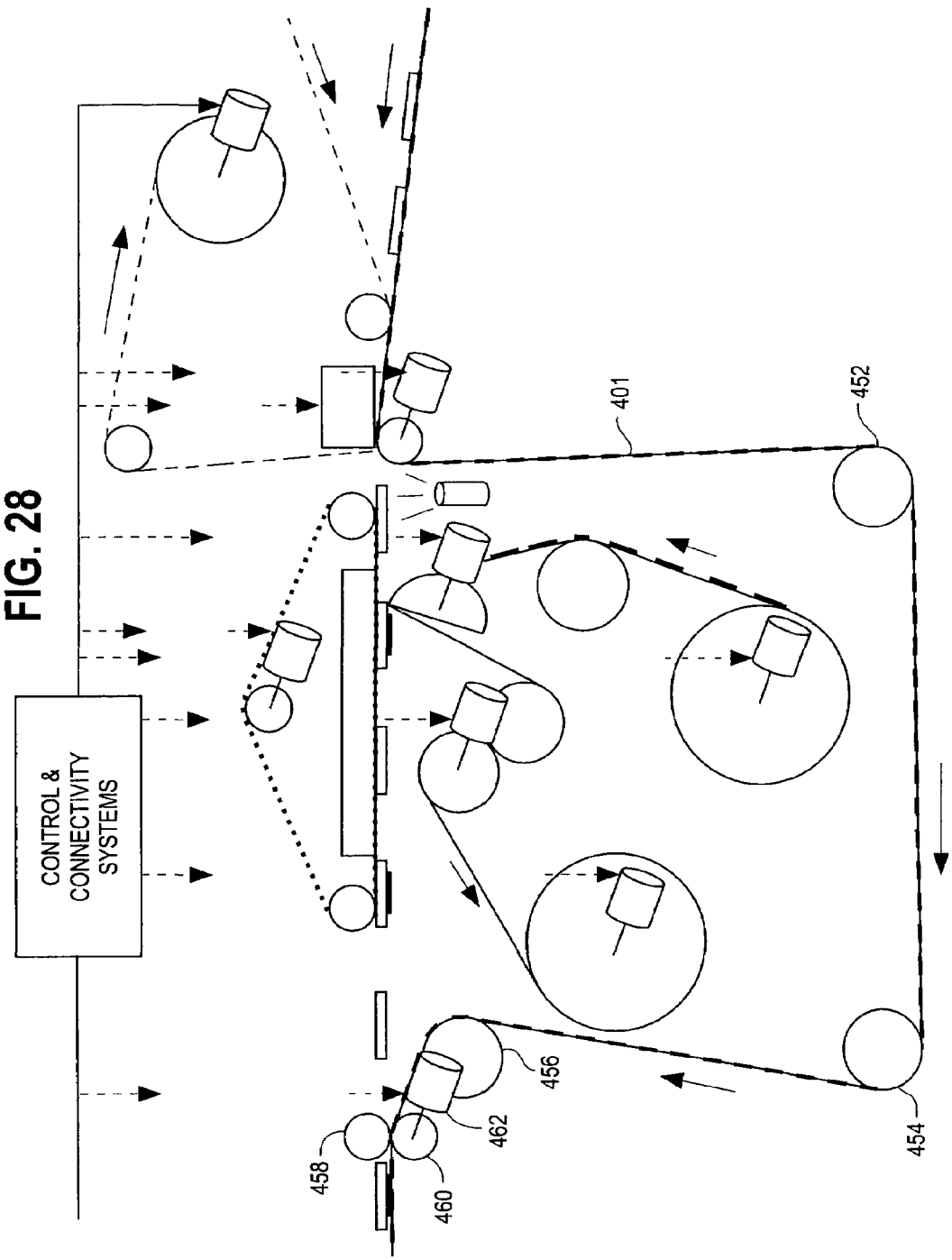

FIG. 28 illustrates an execution of the principles of the invention which is similar to the FIG. 25 and FIG. 27 embodiments, however, rather than the media liner 401 being collected on take-up spool 408, it is guided by guide rollers 452, 454, 456 to nip roller 458 and nip roller 460 driven by motor 462. The FIG. 28 embodiment is useful in environments wherein the finished media sample is not applied immediately to an object, but rather is to be stored for later use. Passing the media samples 400 with attached value-adding elements 418 relaminates the media samples onto the liner 401.

Figure 29:
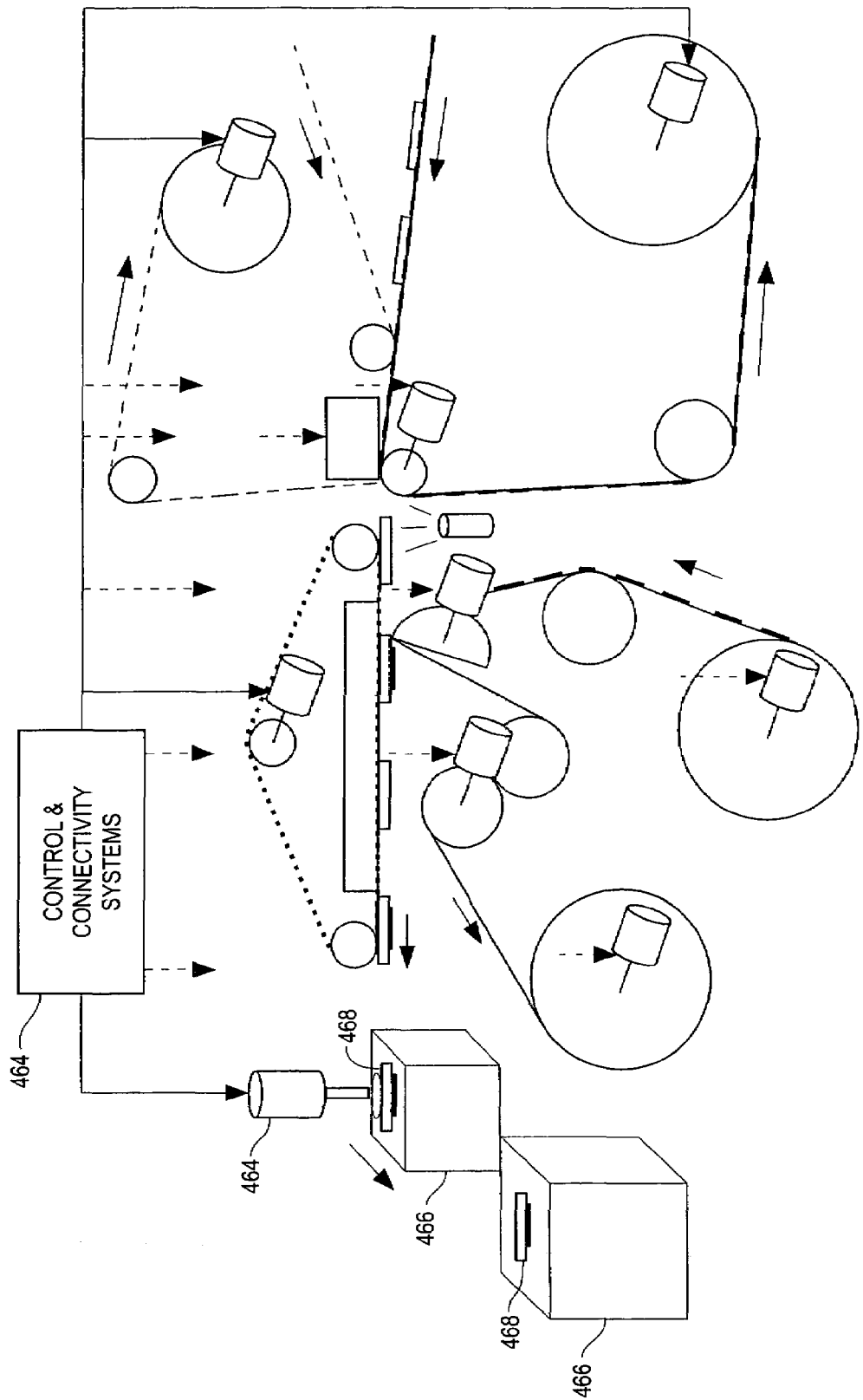

FIG. 29 is another version of the FIG. 25 embodiment wherein the final sandwich 468 of media sample and attached value-adding element(s) is automatically applied to objects 466 moved past the output station of the system. FIG. 29 shows in highly schematic fashion and by way of example a pneumatically-, electrically- or hydraulically-driven tamper 464 which, under control of the control and connectivity system 438, tamps the sandwich 468 to adhere its tacky adhesive-backed surface onto a free surface of the objects 466.

A system which performs a media processing function "on demand" (typically referred to as an "on demand system") is one which is capable of processing media samples one at a time with complete or extensive individual sample customization, as opposed to a batch process system intended to make long runs with little more individual media sample customization than perhaps serialization.

On-demand media processing devices may be configured to deliver the customized media samples at their point of use, as opposed to batch processors which create the processed media samples for later use or application at a secondary location.

On-demand systems may be controlled as a computer peripheral device by a host computer, or controlled within a computer network, or alternatively may be self-contained stand-alone devices possessing full internal processing and control capablity.

Many on-demand systems may permit or require operator interaction to input data or issue commands to perform one or more operations which may include: 1) to locally define or adjust media sample content or format; and/or 2) to call for a data download from a local or remote host computer to define or adjust media sample content or format; and/or 3) to initiate a subsequent action to be applied to one or more of the media samples produced or to be produced.

An on demand media processor is configured to receive (or develop internally with or without manual input) and execute instructions which are effective, at a minimum, to cause the applicator to apply or not apply a value-adding element to a particular media sample. In certain applications, such instructions may determine where on a media sample a value-adding element is to be placed. If the media processor and associated feed system has the features of the FIG. 25 or 27 system or the FIGS. 17–19 system, the on demand instructions may also indicate how many value-adding elements to apply to a media sample 400 and where on the media sample they are to be applied.

If endowed with the attributes of the FIG. 26 system or the FIGS. 17–19 system, the on demand instruction set will also indicate what type of value-adding element(s) is to be applied and it is (or they are) to be applied on a media sample. A system as described with reference to FIG. 27 may process on demand instructions as to whether to apply or not to pass for storage a defective RFID transponder or other value-adding element.

In media processing systems such as discussed with reference to FIGS. 27A and 27B, on demand instructions will determine what type of media sample is to receive one or more value-adding elements.

In media processing systems which include a print device, such as shown at 476 in FIGS. 25–29, on demand instructions may include print control and content instructions, including: 1) print content; 2) print format (non-variable parts of which could be stored internally in memory, for example, and called up on demand); 3) printer configuration commands; 4) graphics-specific commands; 5) code-specific instructions (if enabled for bar code printing, for example); 6) text-specific commands; 7) media feed commands; 8) RFID-specific commands (if RFID transponder(s) are to be applied);

The present invention contemplates selective on demand control of media processing manually or through manual override of computer-controlled systems. Manual commands may be entered by keyboard, voice, mouse, tablet or other input-output means on the product or remotely located and accessible by wire or wirelessly. A serial port may be provided for entry of commands from a handheld device, laptop computer or other source.

From the foregoing, it will also be observed that numerous modifications and variations can be effectuated by those skilled in the art without departing from the true spirit and scope of the novel concepts of the present invention. It is to be understood that no limitation with respect to the specific embodiments illustrated is intended or should be inferred. For example, whereas the value-adding elements have been described as an RFID transponder, coupon, token or the like, a variety of other types of value-adding elements may be selectively and on demand applied to a selected media sample. A class of value-adding elements may be used to provide a unique identification for a media sample (in lieu, for example, of a printed serial number), or as an anti-counterfeiting measure. Such a unique property could be provided by having a unique insert or attachment using technologies such as holography, encoded magnetic strips, microprinting, colored threads.

A media sample could be color coded without the need for a color printer by simply applying to a value-adding element a selected media sample having a predetermined color. Or the chosen color could be determined by the location of the value-adding element on the media sample, for example. Media has been described as labels, tickets, tags or cards, but could be any media, including sheet fed paper, continuous and fan-fold paper, plastic media, and so forth. It should be understood the computer system or processing function could be local with the printer or other media processor or could be part of some computer system used for other purposes (e.g. a general purpose business computer/mainframe, a web server, a desktop PC, a computer system embedded in a consumer product, etc.).

The present invention, offers previously unavailable flexibilities in media sample choice, type and number of value-adding elements to be applied to a selected media sample, and the usual panoply of printer options. The invention thus envisions unique end product media samples which avail synergies between the various functions involved. For example the ability to color code a media sample without the need for a color print device could be accomplished, in addition to the methods described above, by printing a pointer (such as an arrow) at a predetermined location on a media sample. When that media reaches the applicator, a value-adding element in the form of an array of different colors would be applied to the media sample adjacent to the pointer. If the designated color was to be red, for example, and red was a color in the center of the array, the print device would print the pointer where it would be adjacent the red color in the media sample end product.

Obviously, hundreds of synergistic combinations of print graphics, text and/or codes could be combined with value-adding elements having various sizes, shapes, locations, types, and other attributes. As described earlier, the print device could pre-print (or post print depending upon its location) information related to data stored in an RFID transponder so as, for example, to give a human-readable or machine-readable indication of the information stored in the RFID transponder.

The disclosure is intended to cover by the appended claims all such modifications as fall within the scope of the claims when the claims are properly interpreted.

What is claimed is:

1. A media processing a system with printing and converting capability, comprising:
   a. an on demand print device receiving a series of media samples, said print device responding to a set of form and content print instructions which direct the print device regarding what and where to print on selected media samples;
   b. an on demand converting system having an applicator receiving said series of media samples and a series of value-adding elements on a liner, said applicator responding to a set of application instructions which direct the applicator to apply or not apply a value-adding element comprising an RFID transponder, transponder antenna or transponder integrated circuit to selected media samples with the objective that some media samples will be "smart" and others "dumb", said converting system including a peeler receiving the series of value-adding elements and being configured to delaminate selected value-adding elements from the liner, said peeler being adjustable on a sample by sample basis between a first state wherein it is ineffective to delaminate a value-adding element from said liner and a second state wherein it is effective to delaminate a value-adding element from said liner; and
   a first print device configured to print said media samples before being received by said converting system, and a second print device configured to print media samples after a selected value-adding element has been applied.

2. A media processing system with printing and converting capability, comprising:
   a. an on demand print device receiving a series of media samples, said print device responding to a set of form and content print instructions which direct the print device regarding what and where to print on selected media samples; and
   b. an on demand converting system having an applicator receiving said series of media samples and a series of value-adding elements on a liner, said applicator responding to a set of application instructions which direct the applicator to apply or not apply a value-adding element comprising an RFID transponder, transponder antenna or transponder integrated circuit to selected media samples with the objective that some media samples will be "smart" and others "dumb", said converting system including a peeler receiving the series of value-adding elements and being configured to delaminate selected value-adding elements from the liner, said peeler being adjustabie on a sample by sample basis between a first state wherein it is ineffective to delaminate a value-adding element from said liner and a second state wherein it is effective to delaminate a value-adding element from said liner;
   wherein said series of media samples are die-cut or otherwise singulated before being processed by said applicator, said media samples are carried on a liner, and wherein said media processing system is configured to delaminate each media sample from said liner before said value-adding element is applied thereto, and configured to relaminate said media sample to said liner after a value-adding element has been selectively applied thereto.

3. An on demand printer with converting capability, comprising:
   a. a print device receiving a series of labels, tickets, tags, cards or other media samples, said print device responding to a set of form and content print instructions which direct the print device regarding what and where to print on selected media samples;
   b. a converting system having an applicator receiving said series of media samples and a series of value-adding elements, said applicator responding to a set of application instructions which direct the applicator to apply a value-adding element to selected media samples; and
   c. wherein said series of value-adding elements includes RFID transponders of different types with different attributes and said value-adding elements of different types with different attributes are arranged on a supply web in a predetermined repeating sequence.

4. An on demand printer with converting capability, comprising:
   a. a print device receiving a series of labels, tickets, tags, cards or other media samples, said print device responding to a set of form and content print instructions which direct the print device regarding what and where to print on selected media samples;
   b. a converting system having an applicator receiving said series of media samples and a series of value-adding elements, said applicator responding to a set of application instructions which direct the applicator to apply a value-adding element to selected media samples, said series of value-adding elements includes RFID transponders of different types with different attributes; and
   c. said value-adding elements are carried on a liner, and wherein said applicator in response to commands in said instruction set moves said liner bidirectionally to select a value-adding element of a prescribed type for application to a selected media sample.

5. An on demand printer with converting capability, comprising:
   a. a print device receiving a series of labels, tickets, tags, cards or other media samples, said print device responding to a set of form and content print instructions which direct the print device regarding what and where to print on selected media samples;
   b. a converting system having an applicator receiving said series of media samples and a series of value-adding elements, said applicator responding to a set of application instructions which direct the applicator to apply a value-adding element to selected media samples; and
   c. wherein said series of media samples includes first and second media samples of different types with different attributes, said first and second media samples arranged on a supply web in a predetermined repeating sequence, and said first and second media samples are carried on a liner, and wherein said printer in response to said instructions moves said liner bidirectionally to select a predetermined one of said first and second media samples for mating with a selected value-adding element.

6. A media processing system with printing and converting capability, comprising:
   a. an on demand print device receiving a series of media samples, said print device responding to a set of form and content print instructions which direct the print device regarding what and where to print on selected media samples; and
   b. an on demand converting system having an applicator receiving said series of media samples and a series of value-adding elements on a liner, said applicator responding to a set of application instructions which direct the applicator to apply or not apply a value-adding element comprising an RFID transponder, transponder antenna or transponder integrated circuit to selected media samples with the objective that some media samples will be "smart" and others "dumb", said converting system including a peeler receiving the series of value-adding elements and being configured to delaminated selected value-adding elements from the liner, said peeler being adjustable on a sample by sample basis between a first state wherein it is ineffective to delaminated a value-adding element from said liner and a second state wherein it is effective to delaminated a value-adding element from said liner;

wherein, said applicator receives media samples which have been delaminated from a liner and includes a vacuum conveyor arranged to convey the delaminated samples to another work station, and configured to relaminate said media samples to said liner after value-adding elements have been selectively applied thereto.

7. For use in a printer, printer module, stand-alone media converter, or other media processor, an on demand converting system having an applicator receiving a series of media samples and a series of value-adding elements, said applicator responding to a set of instructions which direct the applicator, sample by sample, to selectively apply or not apply a value-adding element to each media sample in said series of media samples;

said series of value-adding elements includes first and second value-adding elements of different types with different attributes; and an element conveyance adapted to convey value-adding elements to said applicator, said instruction set including commands directing whether said first or second value-adding element, or neither value-adding element, shall be applied to said individual media sample.

8. For use in a printer, printer module, stand-alone media converter, or other media processor, an on demand converting system having an applicator receiving a series of media samples and a series of value-adding elements, said applicator responding to a set of instructions which direct the applicator, sample by sample, to selectively apply or not apply a value-adding element to each media sample in said series of media samples;

said series of value-adding elements includes first and second value-adding elements of different types with different attributes; and said first and second value-adding elements arranged on a supply web in a predetermined sequence.

9. An on demand printer with converting capability, comprising:
   a. a print device receiving a series of labels, tickets, tags, cards or other media samples, said print device responding to a set of form and content print instructions which direct the print device regarding what and where to print on selected media samples;
   b. a converting system having an applicator receiving said series of media samples and a series of value-adding elements, said applicator responding to a set of application instructions which direct the applicator to apply a value-adding element to selected media samples, said series of media samples includes first and second media samples of different types with different attributes; and
   c. a media conveyance adapted to convey media samples to said applicator, said instruction set including commands which direct the applicator to apply a value-adding element to a media sample of said first or second type, wherein said first and second value-adding elements are carried on a liner, and said applicator, in response to commands in said instruction set, moves said liner bidirectionally to select a predetermined one of said first and second value-adding elements for application to a selected media sample.

10. For use in a printer, printer module, stand-alone media converter, or other media processor, an on demand converting system having
   a. an applicator receiving a series of media samples and a series of value-adding elements, said applicator responding to a set of instructions which direct the applicator, sample by sample, to selectively apply or not apply a value-adding element to each media sample in said series of media samples;
   b. said series of media samples including first and second media samples of different types with different attributes;
   c. a media conveyance adapted to convey media samples to an applicator, said instruction set including commands directing whether a value-adding element shall be applied to said first media sample or said second media sample, or to neither media sample; and
   d. said first and second media samples carried on a liner, and wherein said applicator in response to said instructions moves said liner bidirectionally to select a predetermined one of said first and second media samples for receipt of a selected value-adding element.

11. For use in a printer, printer module, stand-alone media converter, or other media processor, an on demand converting system having
   a. an applicator receiving a series of media samples and a series of value-adding elements, said applicator responding to a set of instructions which direct the applicator, sample by sample, to selectively apply or not apply a value-adding element to each media sample in said series of media samples;
   b. said series of value-adding elements includes first and second value-adding elements of different types with different attributes and wherein said series of media samples includes first and second media samples of different types with different attributes; and
   c. said first and second value-adding elements arranged on a supply web in a predetermined sequence.

12. For use in a printer, printer module, stand-alone media converter, or other media processor, an on demand converting system having
   a. an applicator receiving a series of media samples and a series of value-adding elements, said applicator responding to a set of instructions which direct the applicator, sample by sample, to selectively apply or not apply a value-adding element to each media sample in said series of media samples;
   b. said series of value-adding elements includes first and second value-adding elements of different types with different attributes and wherein said series of media samples includes first and second media samples of different types with different attributes; and
   c. said first and second value-adding elements being carried on a value-adding element liner, and wherein said media samples are carried on a media liner.

13. For use in a printer, printer module, stand-alone media converter, or other media processor, an on demand converting system having:
   a. an applicator receiving a series of media samples and a series of value-adding elements, said applicator responding to a set of instructions which direct the applicator, sample by sample, to selectively apply or not apply a value-adding element to each media sample in said series of media samples;

b. said series of value-adding elements includes first and second value-adding elements of different types with different attributes and wherein said series of media samples includes first and second media samples of different types with different attributes; and said instruction set includes commands directing which of said first or second value-adding element, or neither value-adding element, shall be applied to a selected one of said first and second media samples, or neither of said media samples.

14. The system of claim 13 wherein the system is under control of a programmed or programmable computer system.

15. The system of claim 14 configured to provide manual override of control by said computer system.

16. For use in a printer, printer module, stand-alone media converter, or other media processor, an on demand converting system having:

a. an applicator receiving a series of media samples and a series of value-adding elements, said applicator responding to a set of instructions which direct the applicator, sample by sample, to selectively apply or not apply a value-adding element to each media sample in said series of media samples;

b. said series of value-adding elements includes first and second value-adding elements of different types with different attributes and wherein said series of media samples includes first and second media samples of different types with different attributes;

c. said first and second value-adding elements are carried on a value-adding element liner, and wherein said media samples are carried on a media liner, wherein said system is configured to move said media liner and said value-adding element liner bidirectionally to select said one or more value-adding elements for application to the selected media sample.

* * * * *